US008838996B2

(12) United States Patent
Kamei

(10) Patent No.: US 8,838,996 B2
(45) Date of Patent: Sep. 16, 2014

(54) NON-TRANSITORY COMPUTER READABLE MEDIUM, PROGRAM PROTECTION APPARATUS, AND PROGRAM PROTECTION METHOD

(71) Applicant: Fuji Xerox Co., Ltd., Tokyo (JP)

(72) Inventor: Mitsuhisa Kamei, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 13/628,598

(22) Filed: Sep. 27, 2012

(65) Prior Publication Data

US 2013/0254556 A1 Sep. 26, 2013

(30) Foreign Application Priority Data

Mar. 26, 2012 (JP) ................................. 2012-070169

(51) Int. Cl.
*G06F 11/30* (2006.01)
*G06F 9/455* (2006.01)

(52) U.S. Cl.
USPC ................................. 713/189; 713/193; 718/1

(58) Field of Classification Search
USPC .................... 713/164–167, 189, 193; 718/1
See application file for complete search history.

(56) References Cited

U.S. PATENT DOCUMENTS

| 5,925,123 | A | * | 7/1999 | Tremblay et al. ............. 712/212 |
| 8,397,242 | B1 | * | 3/2013 | Conover ....................... 719/313 |
| 2002/0046345 | A1 | | 4/2002 | Takeuchi et al. |
| 2003/0023954 | A1 | * | 1/2003 | Wilkinson et al. ............ 717/118 |
| 2003/0101208 | A1 | * | 5/2003 | Chauvel et al. .................. 709/1 |
| 2003/0101334 | A1 | * | 5/2003 | Desoli ........................... 712/227 |
| 2004/0243986 | A1 | * | 12/2004 | Nishiyama .................... 717/139 |
| 2005/0108562 | A1 | * | 5/2005 | Khazan et al. ................ 713/200 |
| 2006/0080537 | A1 | * | 4/2006 | Yoshizaki ..................... 713/176 |
| 2006/0271921 | A1 | * | 11/2006 | Cronce et al. ................. 717/151 |
| 2007/0118763 | A1 | | 5/2007 | Kamei |
| 2008/0046680 | A1 | * | 2/2008 | Nagata et al. ................. 711/207 |
| 2010/0146304 | A1 | * | 6/2010 | Miyatake et al. ............. 713/194 |
| 2011/0271350 | A1 | * | 11/2011 | Lu et al. .......................... 726/26 |
| 2011/0289586 | A1 | * | 11/2011 | Kc et al. ......................... 726/24 |

FOREIGN PATENT DOCUMENTS

| JP | A-10-301772 | 11/1998 |
| JP | A-2007-148575 | 6/2007 |
| JP | B2-4431409 | 3/2010 |

OTHER PUBLICATIONS

Viega et al., "C/C++ Secure Programming Cookbook," 2004, vol. 1, p. 131.

* cited by examiner

*Primary Examiner* — Darren B Schwartz
(74) *Attorney, Agent, or Firm* — Oliff PLC

(57) ABSTRACT

Provided is a non-transitory computer readable medium causing a computer to function as a designation receiving unit that receives designation of a protection target section, a movement arranging unit that moves and arranges the protection target section of a program to a second arrangement location different from a first arrangement location, and a changing unit that changes the protection target section of the program to a substitution code, wherein the substitution code causes a native environment to function as a reconstruction unit that reconstructs context of the native environment as virtual context for a virtual machine in a memory of the native environment, and a virtual machine execution unit that executes the virtual machine, and delivers information indicative of an address in the memory of the virtual context to the virtual machine, so that the virtual machine executes the protection target section using the virtual context.

20 Claims, 23 Drawing Sheets

NON-TRANSITORY COMPUTER READABLE MEDIUM, PROGRAM PROTECTION APPARATUS, AND PROGRAM PROTECTION METHOD

CROSS-REFERENCE TO RELATED APPLICATIONS

This application is based on and claims priority under 35 USC 119 from Japanese Patent Application No. 2012-070169 filed Mar. 26, 2012.

BACKGROUND (i) Technical Field

The present invention relates to a non-transitory computer readable medium, a program protection apparatus, and a program protection method.

(ii) Related Art

In order to conceal secrets which are included in a code executed in a computer or in order to prevent a code from being revised, a method of describing a code based on the command of an individual virtual machine (a virtual Central Processing Unit (CPU)) has been known. In such a method, the analysis of a code is complicated in such a way as to emulate the code described based on the command of the virtual machine in an actual computer (native environment).

It is necessary that a programmer writes a code for the individual virtual machine or prepares a compiler which compiles a code written in a High-level language into a command for the virtual machine.

When the code for the individual virtual machine is emulated on the actual computer (native environment), the execution speed thereof is much slower than the execution speed of a native code for the computer. Therefore, if an entire large-scaled execution program is written in the individual code and emulated, the execution speed is remarkably slow.

In addition, as a JNI (Java (registered trademark) Native Interface), there is a technology of calling a library, which is executed using the CPU of the native environment, from a code emulated on the VM, and mixing the execution of emulation and a program which is run on the native environment. In this technology, it is necessary that a person who writes a program should write a program code used to call the library, and additional knowledge and operation are necessary to write the program.

SUMMARY

According to an aspect of the invention, there is provided a non-transitory computer readable medium causing a computer to function as: a designation receiving unit that receives designation of a protection target section which is a protection target of a program; a movement arranging unit that moves and arranges the protection target section of the program to a second arrangement location which is different from a first arrangement location which corresponds to an arrangement location of the protection target section of the program; and a changing unit that changes the protection target section of the program to a substitution code, wherein the substitution code causes a native environment to function as: a reconstruction unit that reconstructs context of the native environment at a time point in which the program is executed until immediately before the program proceeds to the protection target section as virtual context for a virtual machine in a memory of the native environment, and a virtual machine execution unit that executes the virtual machine, and delivers information indicative of an address in the memory of the reconstructed virtual context using the reconstruction unit to the virtual machine, so that the virtual machine executes the protection target section using the virtual context.

BRIEF DESCRIPTION OF THE DRAWINGS

Exemplary embodiments of the present invention will be described in detail based on the following figures, wherein:

FIG. 10 is a view illustrating states at a time point in which the protection target section is called;

DETAILED DESCRIPTION

In the exemplary embodiment, a part of a program (called a "protection target section". Plural protection target sections may be included in a program) is moved to a location which is different from a location (called a text region or a code region) at which an executable program code is normally located on a memory, and is executed on a virtual machine, thereby attempting to protect, for example, the protection target section (to decrease the possibility of secrets being leaked or the possibility of being manipulated).

Meanwhile, a part of the program excepting the protection target section (called a "non-protection target section") is directly executed in a native environment, thereby implementing a high-speed process (faster than the execution of emulation, that is, execution on the virtual machine).

Typically, the native environment is an execution environment in which a program is run on a physical Central Processing Unit (CPU). However, a case in which a second virtual machine is emulated on a first virtual machine which is emulated on the physical CPU is considered. In this case, the first virtual machine is the native environment of the second virtual machine. For example, there may be a case in which a part (protection target section) of a program which is run on the first virtual machine is converted into code for the second virtual machine which is a separate virtual machine, thereby implementing protection.

In contrast, the virtual machine is a virtual computer (CPU) which is emulated in a native environment. That is, the virtual machine is constructed in such a way that an emulation program in which the operation of the virtual machine is described is run in the native environment. The virtual machine executes the program for the virtual machine (in the exemplary embodiment, the program code of the "protection target section").

In the exemplary embodiment, in order to emulate a part of the program, a structure which, when the execution environment of the program is switched between the native environment and the virtual environment (virtual machine), maintains context between the both environments is inserted into the program. Here, the context is the state of the environment (the native environment or the virtual environment) in which the program is being run, and is the same as the context of a task which is preserved or restored in a context switching process which is performed when a task (process) is switched in a multitasking process. In detail, the context is the value of a register in a relevant environment when the program is being run.

The framework of such a protection will be described in further detail with reference to FIGS. 1 and 2.

Figure 1:
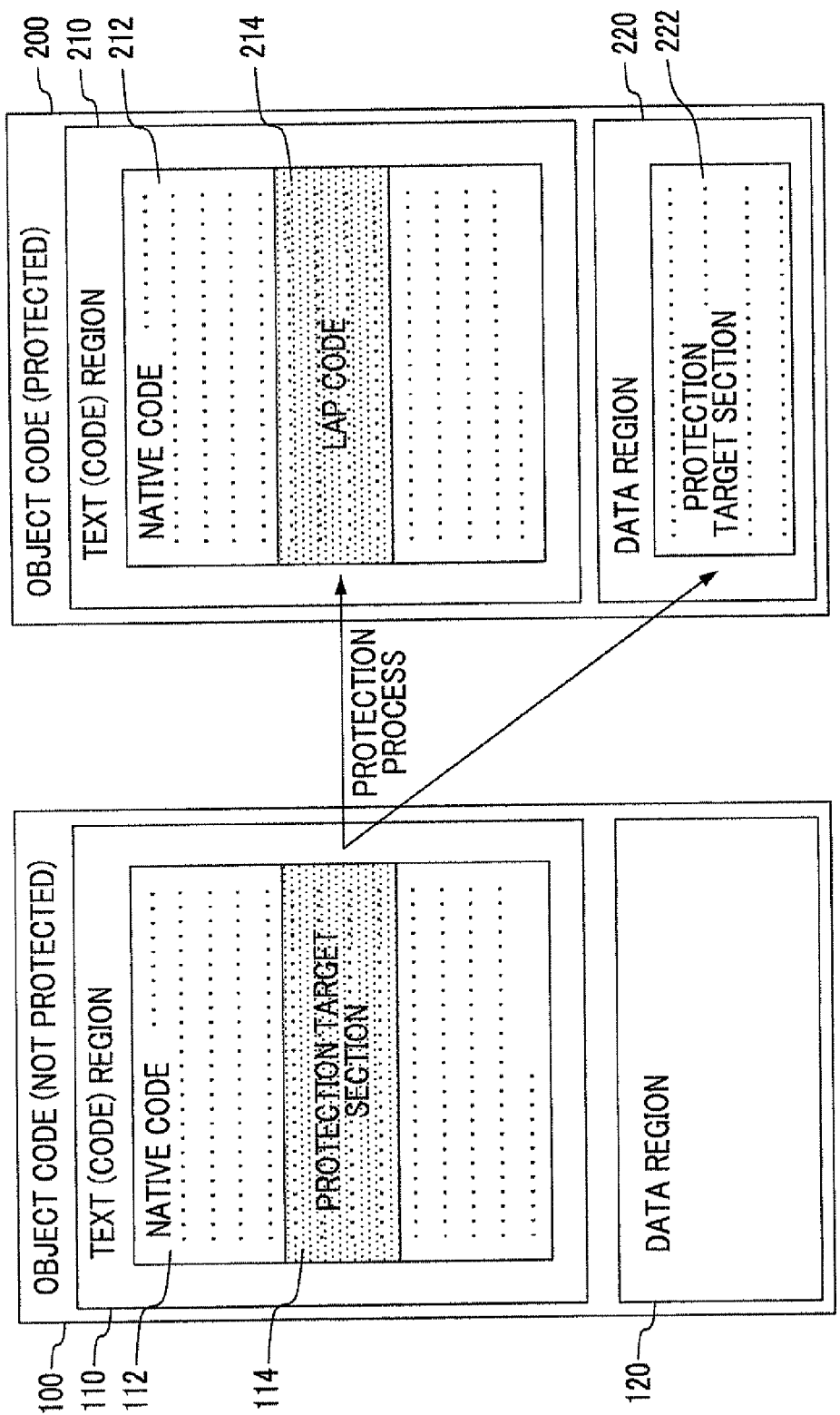
FIG. 1 is a view illustrating a program protection structure according to an exemplary embodiment.

An object code (object file) 100 which is schematically shown in the left of FIG. 1 is obtained by compiling the source code of a program, which is the target of partial protection, and shows a state before the protection process according to the exemplary embodiment is performed. The object code 100 includes sections, such as a text region 110 and a data region 120. The text region 110 is called a code region, and is a region at which the native code 112 (written in a machine language which may be directly executed by the native environment) of the program is allocated. The data region 120 is a region at which data (for example, the arbitrary variable of an initial value) used for the program is placed. When the program is run, the native code which is in the text region 110 of the object code 100 is loaded onto the executable memory region (called the text region or the code region) in the memory (first storage) of the native environment (generally, a computer which runs the program), and data which is in the data region 120 is loaded onto the writable memory region (called the data region) in the memory of the native environment.

In the exemplary embodiment, a user (programmer) designates a protection target section 114, which it is desirable to protect, of the program. The protection target section 114 is designated as a unit in which, for example, a function is used as a unit (a group of one or more functions). However, this is only an example. Since a context maintenance mechanism of switching the execution environment (the native and virtual machines) according to the exemplary embodiment is operated even when the environment is switched at any location of the program, the boundary of switching (that is, the borderline between the protection target section 114 and the non-protection target section) is not limited to the function.

In addition, an object code 200 shown in the right of FIG. 1 is an object code which is generated as a result that the protection process according to the exemplary embodiment is performed on the object code 100.

In the protection process according to the exemplary embodiment, the code of the designated protection target section 114 is moved to the data region 220 (protection target section 222) of the object code 200 together with relocation data. Therefore, when the protection target section 222 is loaded onto the memory of the native environment, the protection target section 222 is loaded onto the data region instead of the code region in the memory. When an attacker analyzes a program which is being run, the attacker starts to analyze the program code of the code region in many cases. Therefore, there is a lower possibility of analyzing the protection target section 222 in the data region than the non-protection target section in the code region.

Meanwhile, the protection target section 114 of the native code 112 in the text region 110 is changed into a lap code 214 (the context thereof will be described later). In addition, the non-protection target sections (sections excepting the protection target section 114) of the native code 112 are not changed. Therefore, in the text region 210 of the protection processed object code 200, the native code 212, obtained in such a way that the protection target section 114 is changed into the lap code 214, is arranged.

Meanwhile, when the protection target section 114 is changed into the lap code 214 and the code size of the latter is greater than that of the former, a process of deleting the former from the native code 112 and inserting the latter into a place (address space) which is empty because of the deletion may be performed. In contrast, if the code size of the latter is less than that of the former, a measure of arranging the latter, that is, the lap code 214 in the position of the text region 210 which is empty, and arranging a lap code call instruction in the place which is empty because of the deletion of the former, that is, the protection target section 114 may be performed.

Figure 2:
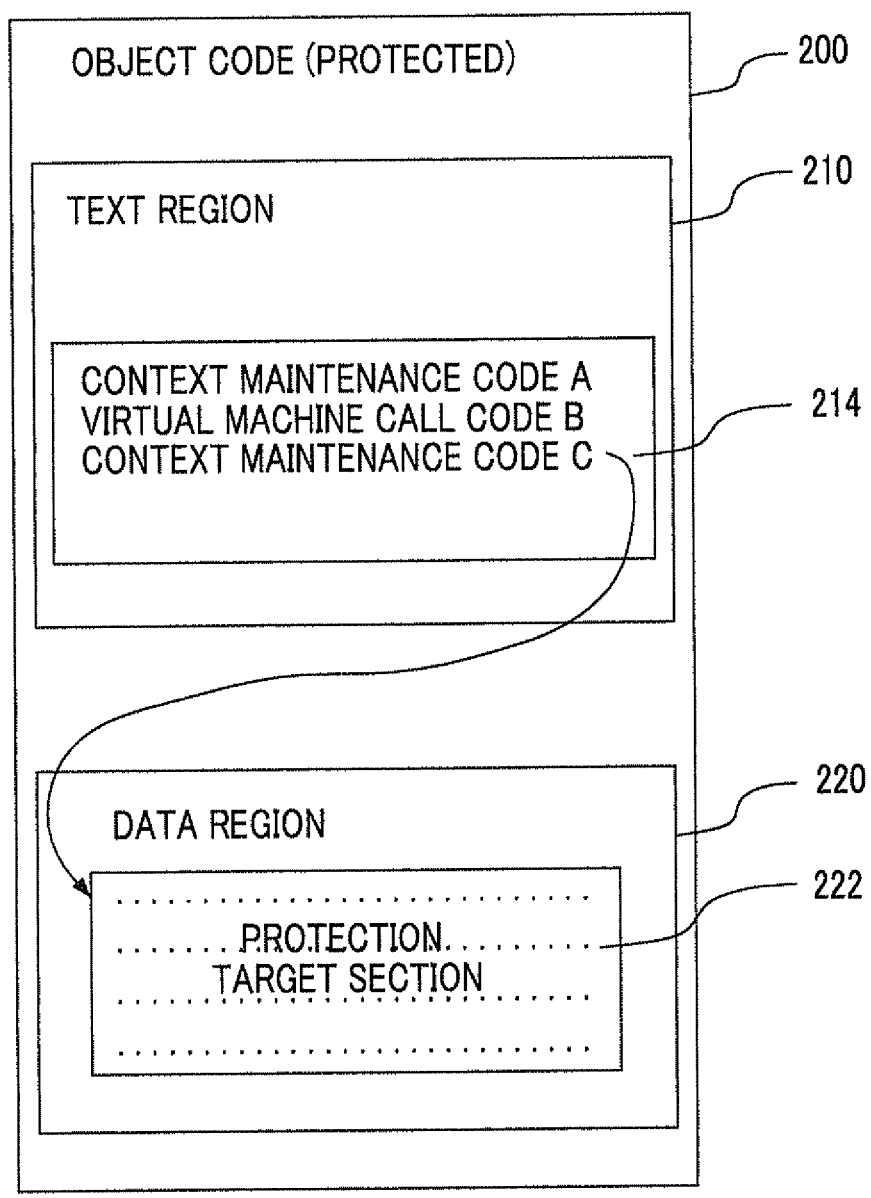
FIG. 2 is a view illustrating an example of the content of a lap code.

FIG. 2 schematically illustrates the content of the codes of the lap code 214. As shown in FIG. 2, a context maintenance code A, a virtual machine call code B, and a context maintenance code C are included in the lap code 214.

The context maintenance code A is code which is executed immediately before the virtual machine is executed, and which describes a process used to maintain context when the execution environment is changed from the native environment to the virtual machine. That is, the context maintenance code A is a native code used to cause the native environment to execute a process of securing a region (called a virtual context region) which maintains context for the virtual machine in the memory (for example, a stack or a writable data region) and of storing the context (for example, the value of the register of the CPU) in the region at a time point in the process that is executed up to immediately before the protection target section 114 of the non-protection target section of the native code 212. The virtual context region includes a virtual register region used to take over, for example, the state of a register. If the native environment executes the native code 212 up to the lap code 214, the context maintenance code A is first executed.

The virtual machine call code B is a code used to call an emulation function which emulates the virtual machine. After the context maintenance code A is executed, the virtual machine call code B is executed.

The emulation function uses information about an address which indicates the code of the protection target section 222 in the (a) data region 220 as an argument. The emulation function (that is, the virtual machine) executed in the called native environment accesses the protection target section 222 which is loaded onto the data region of the memory using the argument, and executes the protection target section 222. Meanwhile, when the size of the protection target section 222 is not known to the emulation function, information about the size of the (b) protection target section 222 may be delivered to the emulation function as an argument. In addition, since the executed emulation function (that is, the virtual machine) executes an arithmetic process using a virtual register region as a register, a pointer to the (c) virtual register region obtained using the context maintenance code A is delivered to the emulation function as an argument. Meanwhile, when the size of the virtual register region is known to the emulation function (for example, when an original program follows a decision with respect to the number of registers which are being used), it is not necessary to deliver the pointer to the virtual register region. In addition, since the emulation function (the virtual machine) progresses the arithmetic process using information about the stack (in which an argument to be delivered or the return address of a function is stored in addition to the register), piled by executing the native code 212 on the native environment until the emulation function is called, as context, a pointer to the head of the stack on the memory at a (d) time point in which the emulation function is called is delivered to the emulation function as an argument. Meanwhile, when the depth of a stack used in a calling source is known to the emulation function (for example, when the size of a stack used for the lap code which includes the context maintenance code is determined in advance), it is not necessary to deliver the pointer to the head of the stack as an argument.

When the emulation function (virtual machine) executed on the native environment performs the preprocessing (prologue) of the corresponding function, the emulation function evacuates the value of a register, which is not destroyed according to a function call rule, to an evacuation region which is secured on the stack, and then secures an automatic change region which is necessary to execute emulation on the stack. Thereafter, the corresponding virtual machine writes the head address of the stack (for example, the head of a stack at the time point) which has not been used yet as a pointer indicating the head of the stack, used when the corresponding virtual machine executes the protection target section 222, in a specific register sp (stack pointer) included in the virtual register region which is secured when the context maintenance code A is executed, thereby starting the emulation.

The virtual machine (emulation function) emulated on the native environment reads the protection target section 222 included in the data region using the address delivered as the argument, and progresses the process as necessary using the virtual register region, the stack, and the normal data region on the memory according to the instruction of a command shown in the section 222. Thereafter, when the execution of the emulation reaches a return command (ret command) in the emulation function, the process returns to the lap code 214.

When the process returns from the emulation function to the lap code 214, the value of the register which is evacuated at the time of prolog and which may not be destroyed is rewritten in the register of the native environment at a time in which the post processing (epilog) of the corresponding function is performed. In this state, the context maintenance code C included in the lap code 214 is executed by the native environment.

Since the value returned from the protection target section is placed in the virtual register region at a time point in which the context maintenance code C is executed, the context maintenance code C copies the return value into the register of the native environment which stores an actual return value. In addition, setting is made such that the value of the stack pointer indicates a location at which the return address to the calling source, obtained at a time point in which the lap code 214 is initially called, is stored. Therefore, the process is returned to the execution of the native code 212 of a calling source from the lap code 214, thereby implementing a state in which the native code 212 may be continuously executed. In this state, the native environment continuously executes the native code 212.

Figure 3:
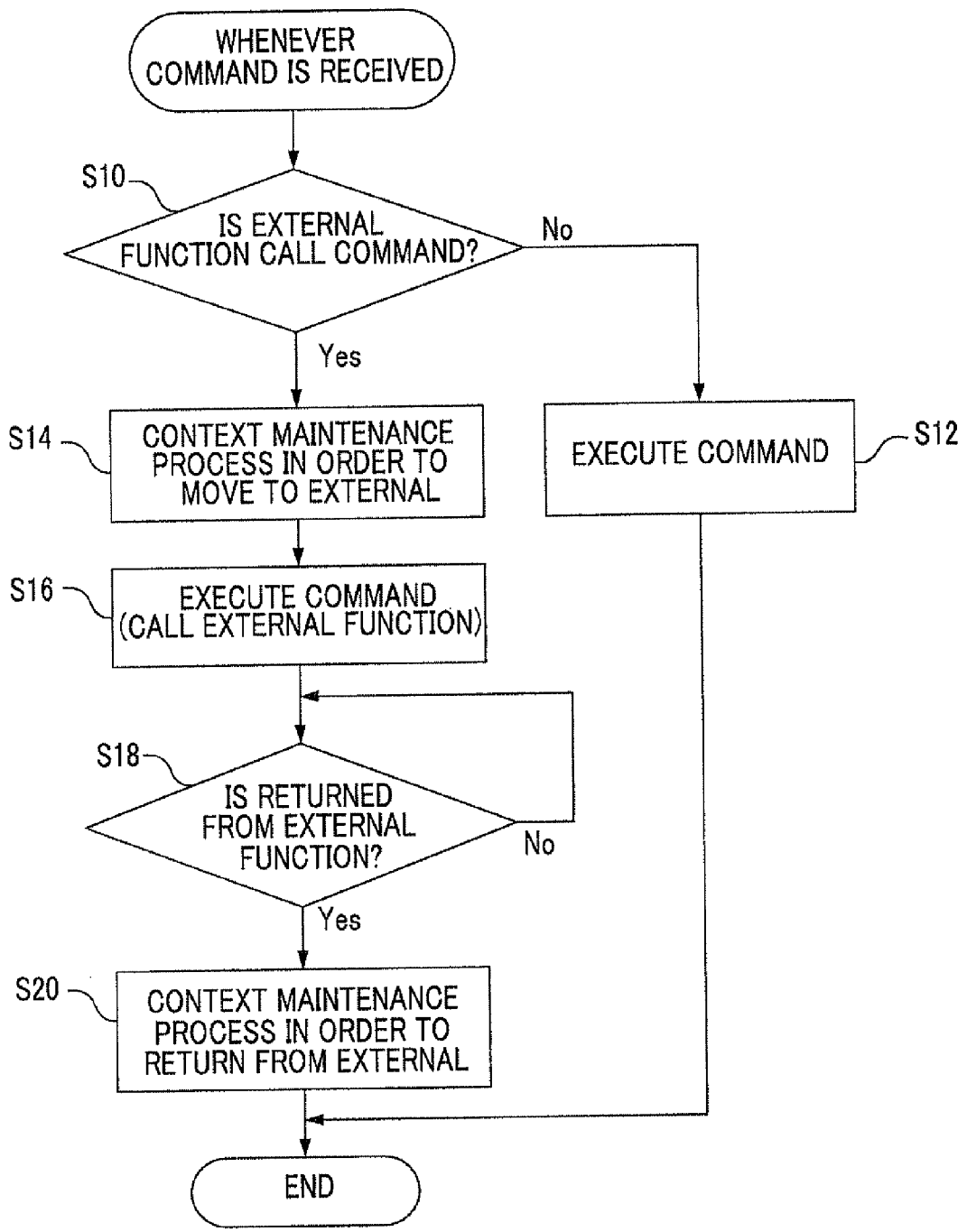
FIG. 3 is a view illustrating an example of the procedure of a process of calling an external function from a protection target section which is executed on a virtual machine.

As described above, the structure, in which the context is maintained when the process proceeds from the non-protection target section of the native code 212 to the protection target section 222, has been described. However, the exemplary embodiment further provides a structure in which the external function which is external to the protection target section 222 is executed based on the protection target section 222 which is being executed using the virtual machine. Here, the external function is a function included in, for example, the non-protection target section of the native code 212, or a library prepared for the native environment. The structure is built in the virtual machine (emulation function). FIG. 3 illustrates the operation of the virtual machine according to the exemplary embodiment.

In the procedure shown in FIG. 3, whenever the virtual machine receives a command based on the execution of the protection target section 222, the virtual machine determines whether the command is a function call command used to call an external function or not in step S10. If the received command is not the function call command, the virtual machine only executes the command in step S12.

Meanwhile, if the received command is the function call command, the virtual machine performs the context maintenance process, which takes over the context on the virtual machine to the native environment, before the command is executed in step S14. That is, while the protection target section 222 is executed on the virtual machine, the external function is executed on the native environment. Therefore, the virtual context (in which the argument to the external function is included) formed on the virtual machine is taken over to the context of the native environment which executes the external function until the function call is performed by executing the protection target section 222. In addition, since the native environment emulates the virtual machine (emulation function) until the external function is called, the native environment maintains the context (for example, the evacuation of the stack pointer used to execute emulation) in which the process is returned to the execution of the emulation after the external function is terminated.

After the context is maintained, the function call command which calls the external function is executed in step S16. After the external function is called, a return command which indicates the return from the external function to the protection target section 222 is awaited in step S18.

If the return command is received from the external function, the virtual machine performs the context maintenance process of taking over the context (which includes a return value from the external function) of the native environment which is executing the external function until that moment in step S20. That is, the context of the native environment at the time point in which the return command is received includes the return value from the external function and the pointer to the stack which is used for the execution of the external function, and the context of the native environment is taken over to the virtual context of the virtual machine in step S20 such that the returned protection target section 222 may continue an operation using the return value. In addition, the process of the native environment returns to the execution of the emulation of the virtual machine after the return command is received. Therefore, in step S20, context, in which the stack pointer obtained before the external function evacuated in step S14 is called is rewritten in the native environment, is maintained. Based on such context maintenance, the native environment restarts to execute the emulation of the virtual machine, which is stopped once in order to execute the external function, and the restarted virtual machine receives the return value from the external function and continues the protection target section 222.

As described above, the structure in which a program is partially protected by executing the virtual machine according to the exemplary embodiment and in which the external function is executed based on the partially protected section has been described. Next, an example of the structure of an apparatus used to partially protect a program according to the exemplary embodiment will be described with reference to FIG. 4.

In this example, the source code 300 (for example, written in a high-level language) of a program is input to a compiler 10 and a protection target section designation unit 12. The compiler 10 compiles the source code 300, and outputs an object code 100. The object code 100 is obtained before the protection process is performed, as shown in FIG. 1.

In an example, the protection target section designation unit 12 displays the source code 300 as it is, and receives a range designation operation of the section corresponding to the protection target of the displayed source code 300 from a user. In an example, the protection target section is a section included in a function unit (a group of one or more functions). However, the invention is not limited thereto. For example, a part of a single function may be used as the protection target section.

In addition, when the protection target section is used in units of a function, the protection target section designation unit 12 may receive the input of the function names of one or more functions corresponding to the protection target of the source code 300 from the user.

The protection target section designation unit 12 specifies the protection target section 114 (refer to FIG. 1) of the object code 100 based on the designation of the user. The results of the specification are delivered to a code rewriting unit 14 and a protection target section extracting unit 16.

The code rewriting unit 14 performs a rewriting process of changing the protection target section 114 of the object code 100, which is specified using the protection target section designation unit 12, into the lap code 214. The protection target section 114, which is a target of the rewriting, is a part of the native code 112 included in the text (code) region 110 in the object code 100. When the protection target section 114 is changed into the lap code 214, the changed text region 210 which includes the lap code 214 is obtained instead of the protection target section 114.

The protection target section extracting unit 16 extracts the code of specified protection target section 114 of the object code 100 using the protection target section designation unit 12. Thereafter, a protection target section movement unit 18 moves the extracted code of the protection target section 114 to the data region 220 of the object code 200, and arranges the extracted code. Therefore, the protection target section 114 is the protection target section 222 of the data region 220.

Meanwhile, the code rewriting unit 14 and the protection target section movement unit 18 share information about the arrangement location (address) of the protection target section 222 of the data region 220. The sharing may be implemented in such a way that the protection target section movement unit 18 notifies the code rewriting unit 14 of the address of the destination of the movement of the protection target section 222 in the data region 220. In contrast, the sharing may be implemented in such a way that the code rewriting unit 14 indicates the protection target section movement unit 18 about the address of the destination of the movement of the protection target section 222. The code rewriting unit 14 sets information about the address of the protection target section 222 to the argument of the virtual machine call code B of the lap code 214 (refer to FIG. 2).

With the above-described configuration, the object code 200, in which the protection target section 222 is executed in the virtual machine, and the other sections (non-protection target sections) are executed in the native environment, is prepared.

An example of the flow of a process in a case in which the protected program (object code 200), generated using the above-described apparatus, is run in the native environment will be described below.

In this example, it is assumed that the unit of emulation is a function. That is, it is assumed that the protection target section 222, which is executed on the virtual machine, is one or plural functions (that is, the boundary surface of switching the native environment and the virtual machine environment is a function). In an example below, in order to avoid complications, it is assumed that the protection target section 222 is a single function (even if it is assumed as described above, the generality is not spoiled), and that a function which indicates the protection target section 222 is called "protection target function". In an example below, description will be made using an example in which a technology is applied to the program of an architecture in which two or less arguments on the top of the function of a calling source are inserted into the registered, and the remaining two arguments are inserted into the stack and delivered to the function of a calling destination, and the address of a return destination from the function of the calling destination is inserted into the stack head and delivered to the function of the calling destination.

Hereinafter, a description will be made while showing the flow of a process when the protection process according to the exemplary embodiment is applied to a program having such an architecture, and the program (object code 200) obtained after the protection process is performed is executed in the native environment, and the states of the stack and register which are used in the native environment will be described with reference to the drawings.

Figure 5:
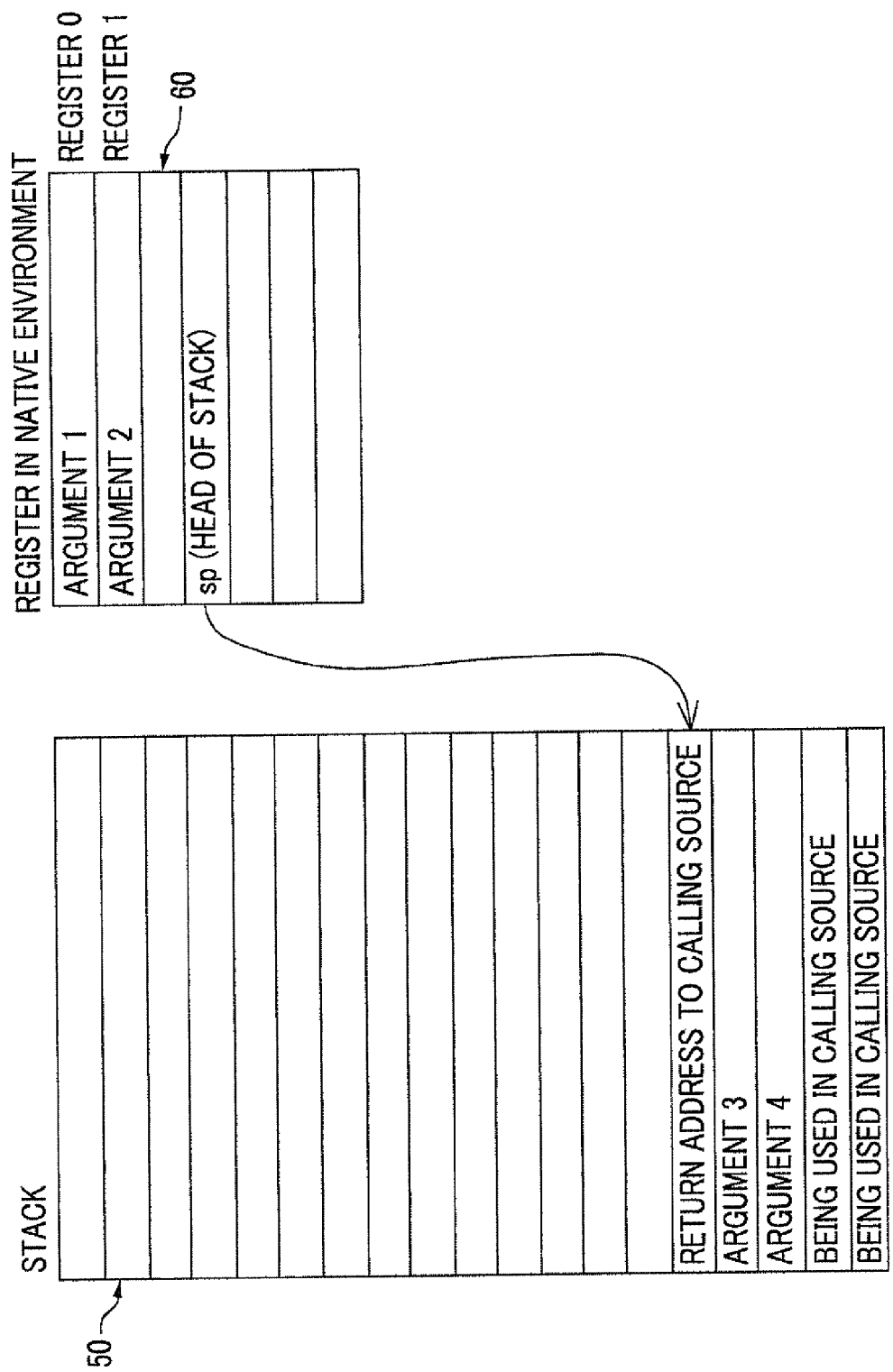
FIG. 5 is a view illustrating the states of the actual stack and the actual register group of a native environment when a program which is protected using the apparatus according to the exemplary embodiment is run, and, in particular, illustrating states at a time point in which the protection target section is called.

FIG. 5 illustrates the states of a stack 50 and an actual register group 60 in the native environment at a time point in which a protection target function is called from the function (native code) of the calling source (strictly speaking, at a time point in which the lap code 214 converted into the protection target function is called in the native code 212). Meanwhile, in order to distinguish from a virtual stack and a register which are used by a virtual machine which will be described later, the stack 50 and the register group 60 used by the native environment are called an "actual stack" 50 and an "actual register" group 60.

In this example, the protection target function is called together with four arguments (called arguments 1, 2, 3, and 4). At this time point, the value of a return address to the calling source is placed in the head (top) of the actual stack 50, and then the argument 3 and the argument 4 are sequentially placed in this order. In addition, at this time point, in a register sp for the previously determined stack pointer of the actual register group 60 which is being used by the native environment, the value of an address, which indicates a location in the stack at which the above-described return address is placed, is placed. In addition, the argument 1 is placed in a 0-th register (called "register 0") and the argument is placed in a first register (called "register 1"), respectively. A register, called an instruction pointer (ip) or a program counter (pc), indicates the head of the lap code 214 which is reset to the protection target function. However, since the register is not important here, the register is not shown in the drawing.

Figure 6:
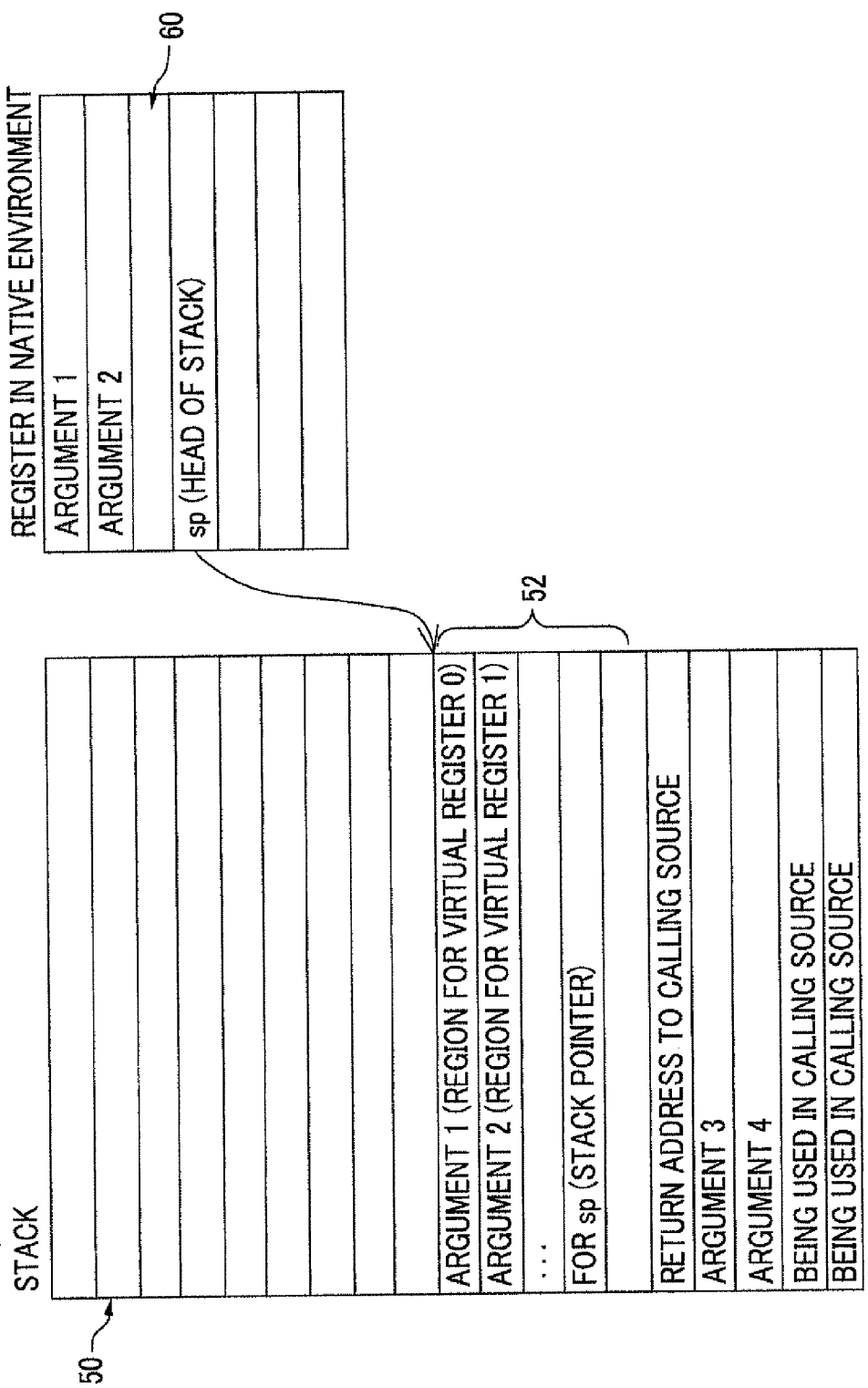
FIG. 6 is a view illustrating the states of the actual stack and the actual register group of the native environment when the program which is protected using the apparatus according to the exemplary embodiment is run, and in particular, illustrating states after a context maintenance code A is executed.

FIG. 6 illustrates the states of the actual stack 50 and the actual register group 60 immediately after the context maintenance code A (refer to FIG. 2) included in the lap code 214 is executed. The executed context maintenance code A first decrements the stack pointer sp in the actual register group 60 to as many as a necessary size (the size is already known) in order to secure a region in which the virtual machine stores the virtual register region 52 used as a register. This example is an example in which the virtual register region 52 is secured in the actual stack 50 of the memory of the native environment. Thereafter, the executed context maintenance code A causes the values of the registers in which the arguments are stored, that is, the values of the registers 0 and 1 in which the argument 1 and the argument 2 are included in this example, to be written into regions corresponding to the registers of those arguments in the secured virtual register region 52 (theses regions are the virtual registers 0 and 1).

Figure 7:
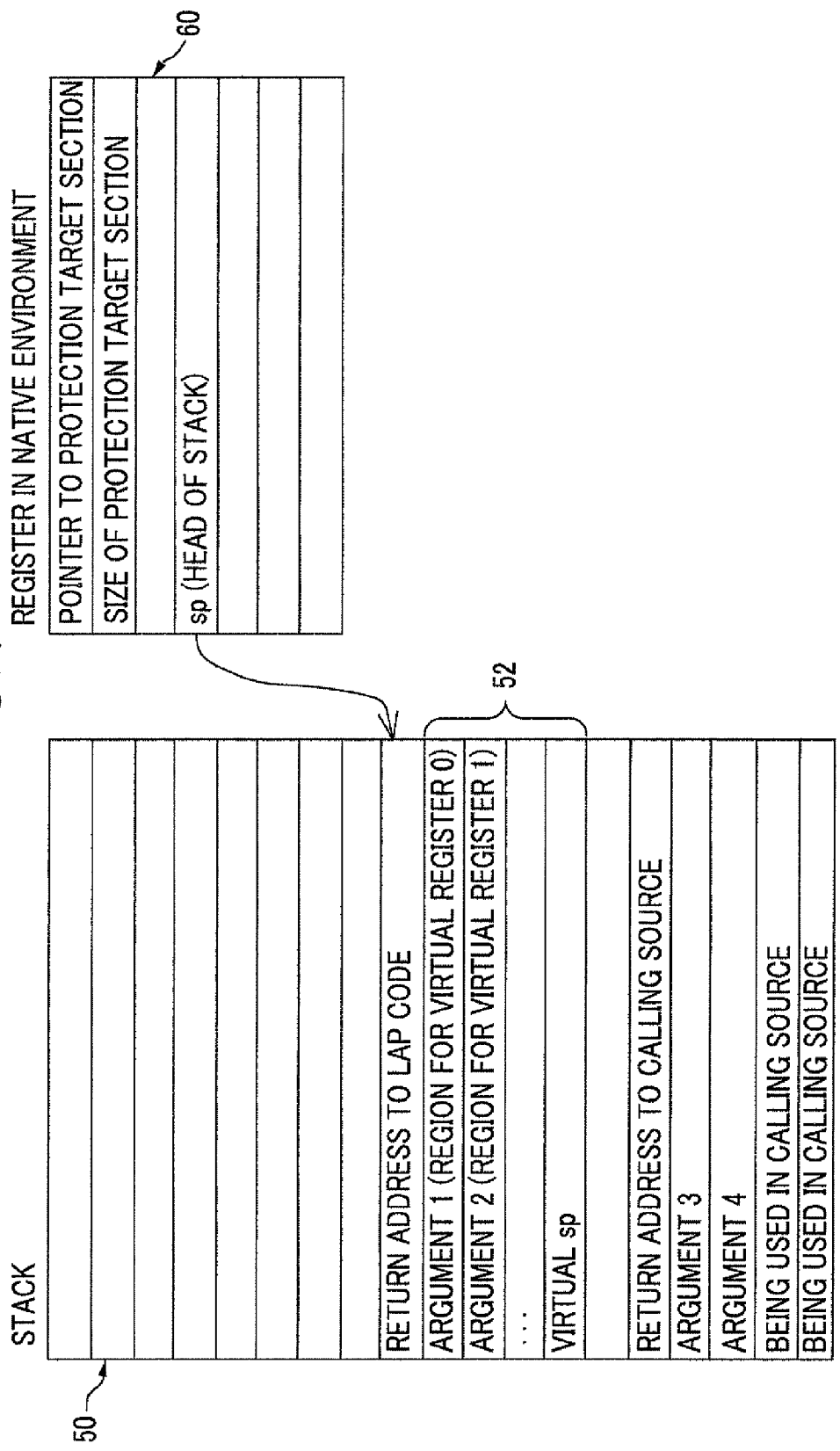
FIG. 7 is a view illustrating the states of the actual stack and the actual register group of the native environment when the program which is protected using the apparatus according to the exemplary embodiment is run, and in particular, illustrating states at a time point in which the virtual machine is called.

FIG. 7 illustrates the states of the actual stack 50 and the actual register group 60 at a time point in which the virtual machine call code B of the executed lap code 214 causes an emulation function virtual machine) to be called. At this time point, in the register 0 of the actual register group 60, a pointer to a location, at which the protection target function (protection target section 222) which is a target to be emulated, of the data region (the region which may be written in order to place data) in a memory space is set to the argument 1 to be delivered to the emulation function. In addition, in the register 1, the size of the protection target function (code size) is set to the argument 2 to be delivered to the emulation function. Thereafter, as the results of the execution of the virtual machine call code B, a return address to the lap code 214 is stored in the head of the actual stack 50.

Figure 8:
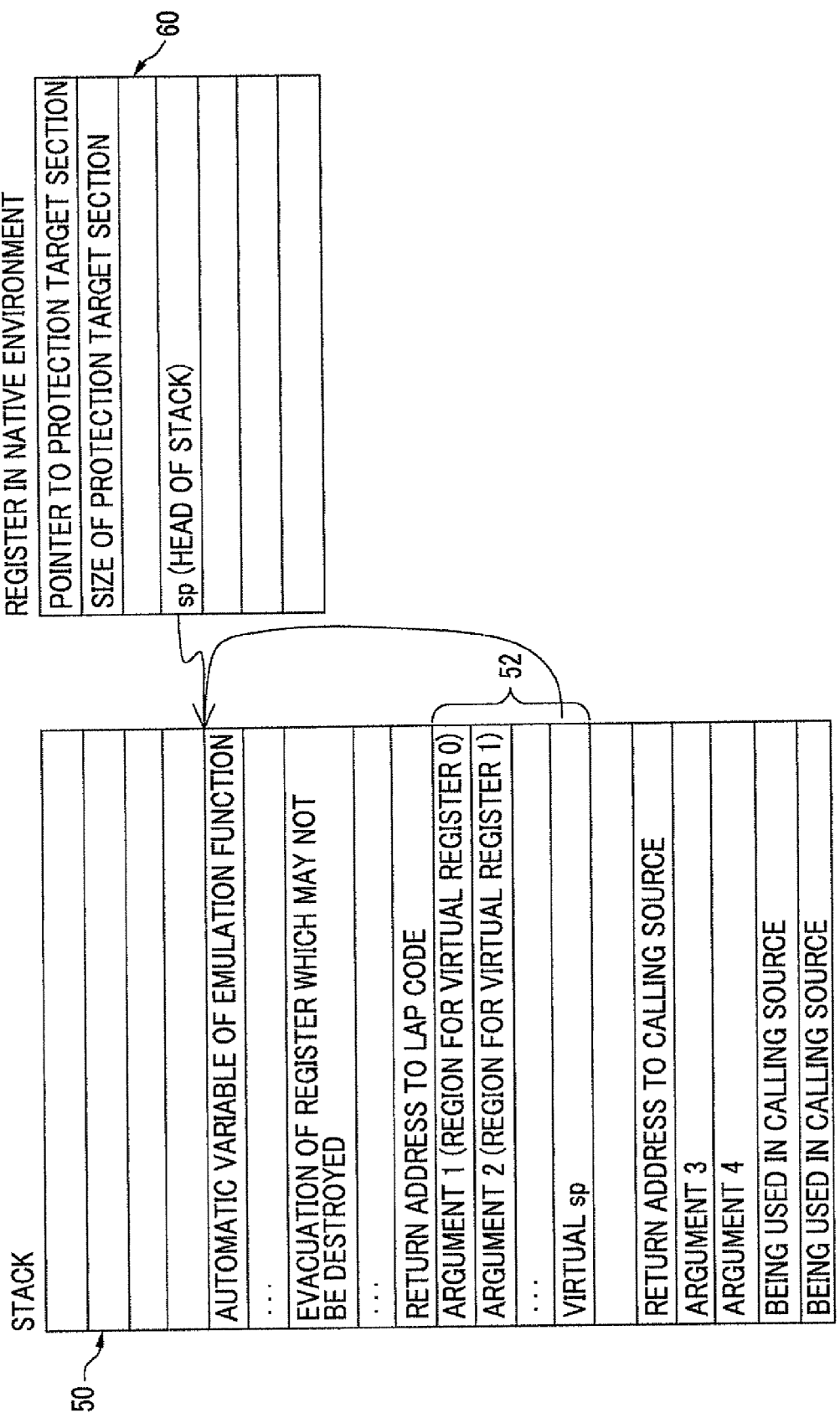
FIG. 8 is a view illustrating the states of the actual stack and the actual register group of the native environment when the program which is protected using the apparatus according to the exemplary embodiment is run, and in particular, illustrating states at a time point in which the execution of the protection target section starts using the virtual machine.

FIG. 8 illustrates the states of the actual stack 50 and the actual register group 60 at a time point in which the execution of the preprocessor (prolog) of the emulation function (virtual machine) is terminated. With the execution of the prolog, the value of a register, which is not destroyed according to the function call rule, of registers which are used for the execution of the emulation function in the actual register group 60 is evacuated to the stack 60, and, further, the value of the stack pointer sp of the actual register group 60 is decremented as many as a necessary value in order to secure a region for an automatic variable used to execute the emulation function (in this example, it is assumed that the actual stack 50 grows in the direction in which the address is small). In this preprocessing, the value of the address of the protection target function (protection target section 222) and the code size which are delivered as the arguments are set in corresponding variable regions in the automatic variable regions secured from the actual register group 60. Thereafter, the address of a location which is not yet used in the actual stack 50, for example, the head of the actual stack 50, is set to the head of the virtual stack. That is, the address is set to the region corresponding to the stack pointer sp in the virtual register region 52. Meanwhile, the virtual stack is a region which is used as the stack by the virtual machine (emulation function), and is secured in the actual stack 50.

Figure 9:
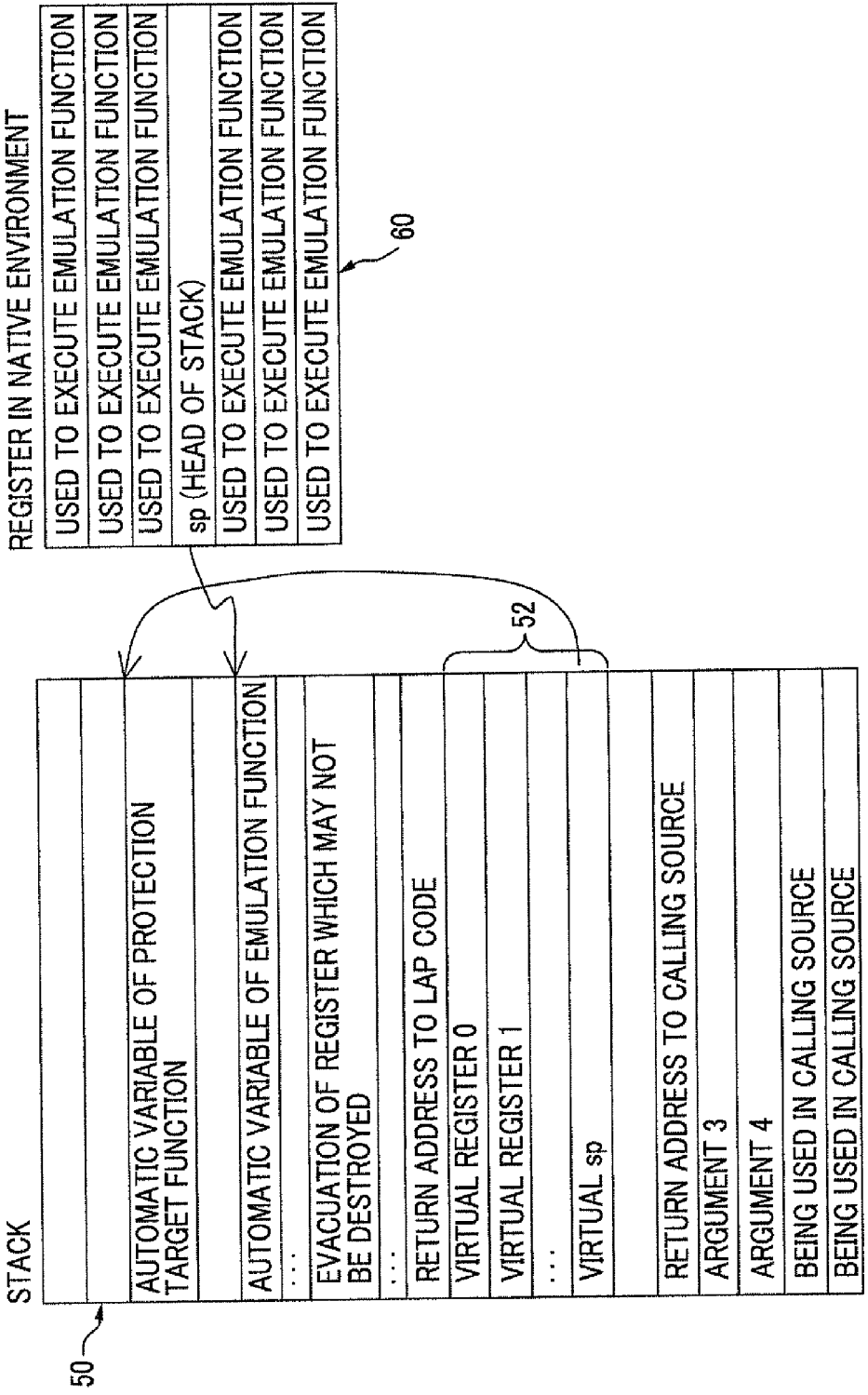
FIG. 9 is a view illustrating the states of the actual stack and the actual register group of the native environment when the program which is protected using the apparatus according to the exemplary embodiment is run, and, in particular, illustrating a state when the protection target section is being executed using the virtual machine.

FIG. 9 illustrates the states of the actual stack 50 and the actual register group 60 when the emulation of the protection target function is being executed by processing the emulation function. The emulation function (that is, the virtual machine) which is executed in the native environment reads the command code of the protection target function one by one, and executes a process according to the command using the virtual register region 52 and the virtual stack. In the execution of the protection target function, that is, the emulation process performed on such a virtual machine, the preprocessing section (prolog) of the protection target function is initially executed. Therefore, in order to evacuate the register (in this case, the virtual register region) on the virtual stack or in order to secure the region for the automatic variable used by the corresponding protection target function on the virtual stack, the value of the virtual stack pointer (virtual sp) is decremented or the argument delivered through the register is evacuated as the initial value of the automatic variable. Thereafter, the main body of the protection target function is processed using the virtual machine. Meanwhile, at this time, the native environment executes the emulation function using the region for the automatic variable of the emulation function, which is secured in the actual stack 50, and the stack pointer sp of the actual register group 60 indicates the head of the region for the automatic variable.

Meanwhile, the protection target function on which emulation is executed (that is, executed using the virtual machine) performs a process using the argument 3 and the argument 4 delivered from the function of the calling source of the protection target function of the native code 112 (212). These arguments 3 and 4 are stored in a more inner side than the head of the stack 50 (an address indicated using an arrow a in FIG. 10, that is, the address in which the value of the "return address to the calling source" is stored) at a time point in which the protection target function (with more precision, the lap code 214 which is substituted for the protection target function). In contrast, if the native environment executes the protection target function as it is without protecting the program according to the exemplary embodiment, a command that values are read from the locations which are subordinate by one (where the argument 3 is stored) and by two (where the argument 4 is stored) than the reference location indicated using the arrow a is executed.

Figure 10:
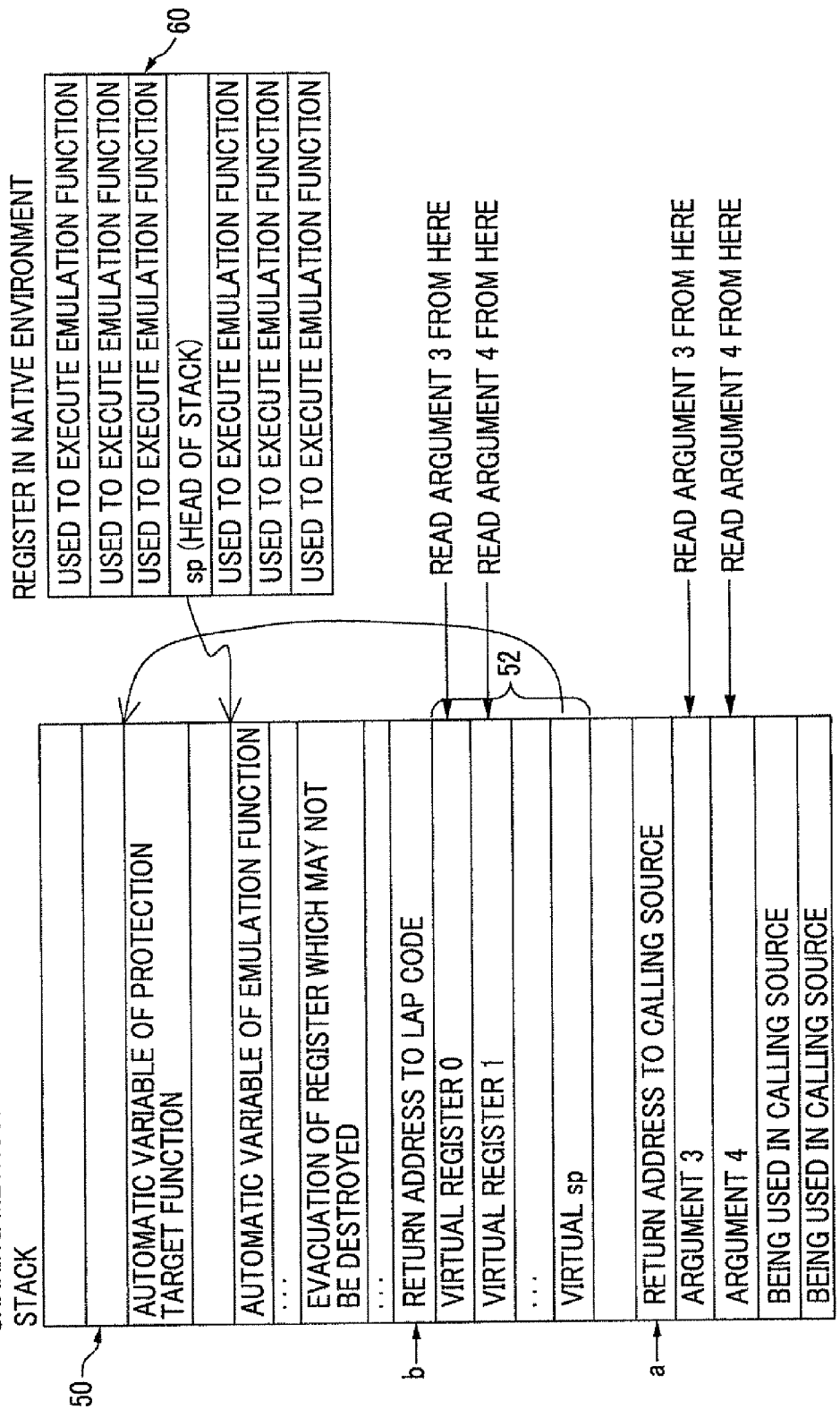
FIG. 10 is a view illustrating the states of the actual stack and the actual register group of the native environment when the program which is protected using the apparatus according to the exemplary embodiment is run, and in particular, illustrating a case in which a wrong argument in the stack is read when the protection target section is executed using the virtual machine. In particular.

However, when the protection target function is performed on the virtual machine, the command that the argument 3 and the argument 4 of the protection target function are read instructs them to read addresses in the virtual stack used by the virtual machine, and in detail, the locations which are subordinate by one and by two than the head of the stack (the address in which the value of the "return address to the lap code" indicated using an arrow b is stored in FIG. 10) at a time point in which the virtual machine is called. These locations are the virtual registers 0 and 1 of the region secured as the virtual register region 52 by the context maintenance code A. Data read from these locations is different from the argument 3 and the argument 4.

In order that the protection target function executed on the virtual machine correctly reads the argument 3 and the argument 4 in the actual stack 50 while avoiding the above-described states, the virtual machine is provided with a function of replacing the address of a readout destination in the exemplary embodiment. That is, when the command of the protection target function is a command that the address of the inner side (that is, the side on which the size of the address value is large, the bottom side in FIG. 10) than the head (the address indicated using the arrow b) of the stack is read at the time point in which the corresponding virtual machine is called, the virtual machine executes the command in such a way as to replace it with a command that the data on the "inner side" than the target address as much as the difference between the addresses a and b (a−b), that is, data of a "large" address in FIG. 10 is read. Meanwhile, when the command of the protection target function is a command that an address which is shallower (that is, smaller) than the address b is read, the virtual machine executes the command without replacing the address.

In an example, in order to enable the addresses to be replaced, the difference in the addresses (a−b) or the address a of the head of the stack at a time point in which the protection target function is called is delivered to the emulation function (virtual machine) as an argument. In a case of the latter, since the virtual machine knows the address b of the head of the stack at the time point in which the virtual machine is called, the difference in the addresses (a−b) may be calculated based on the address a and the address b which are received as the arguments. In addition, as another example, the amount of stacks (that is, the difference in the addresses (a−b)) which are used for the process performed using the lap code (and the context maintenance code thereof) may be determined in advance, and the value of the amount of stacks may be transmitted to the virtual machine.

Figure 11:
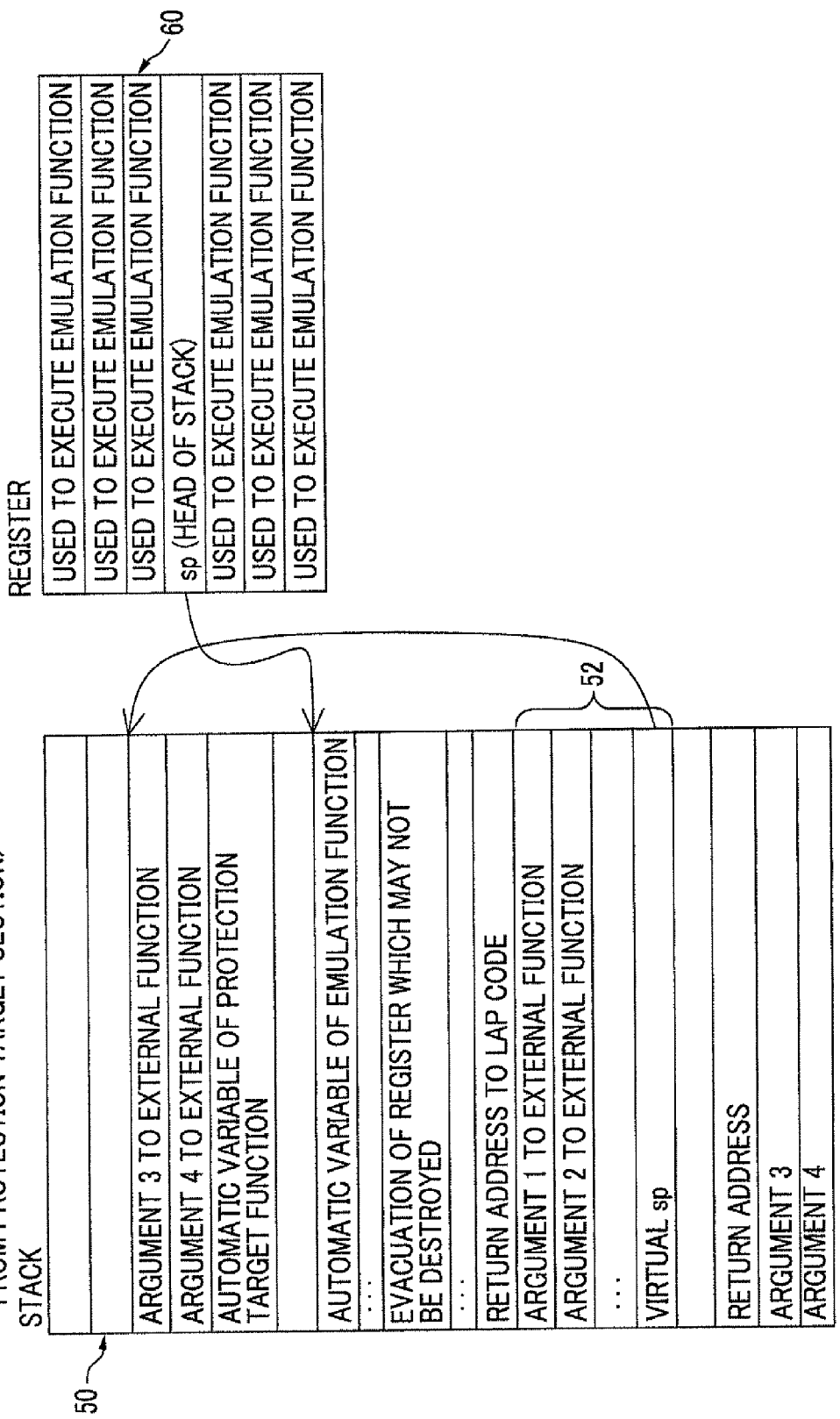
FIG. 11 is a view illustrating the states of the actual stack and the actual register group of the native environment when the program which is protected using the apparatus according to the exemplary embodiment is run, and, in particular, illustrating states at a time point in which the external function is called from the protection target section which is being executed using the virtual machine.

FIG. 11 illustrates the states of the actual stack 50 and the actual register group 60 immediately before the external function is called from the protection target function. The external function described here means an "external" function with respect to the protection target function, and is a function which is directly executed in the native environment. For example, the function of the non-protection target in the native code 212 or a library provided by the native environment is an example of the external function.

The arguments, which are necessary when the external function is called until the command that the external function is called while the emulation is being executed is reached, are set on the virtual register region 52 (argument 1 and the argument 2) and the virtual stack (the argument 3 and the argument 4 of the top (head) of the virtual stack).

Figure 12:
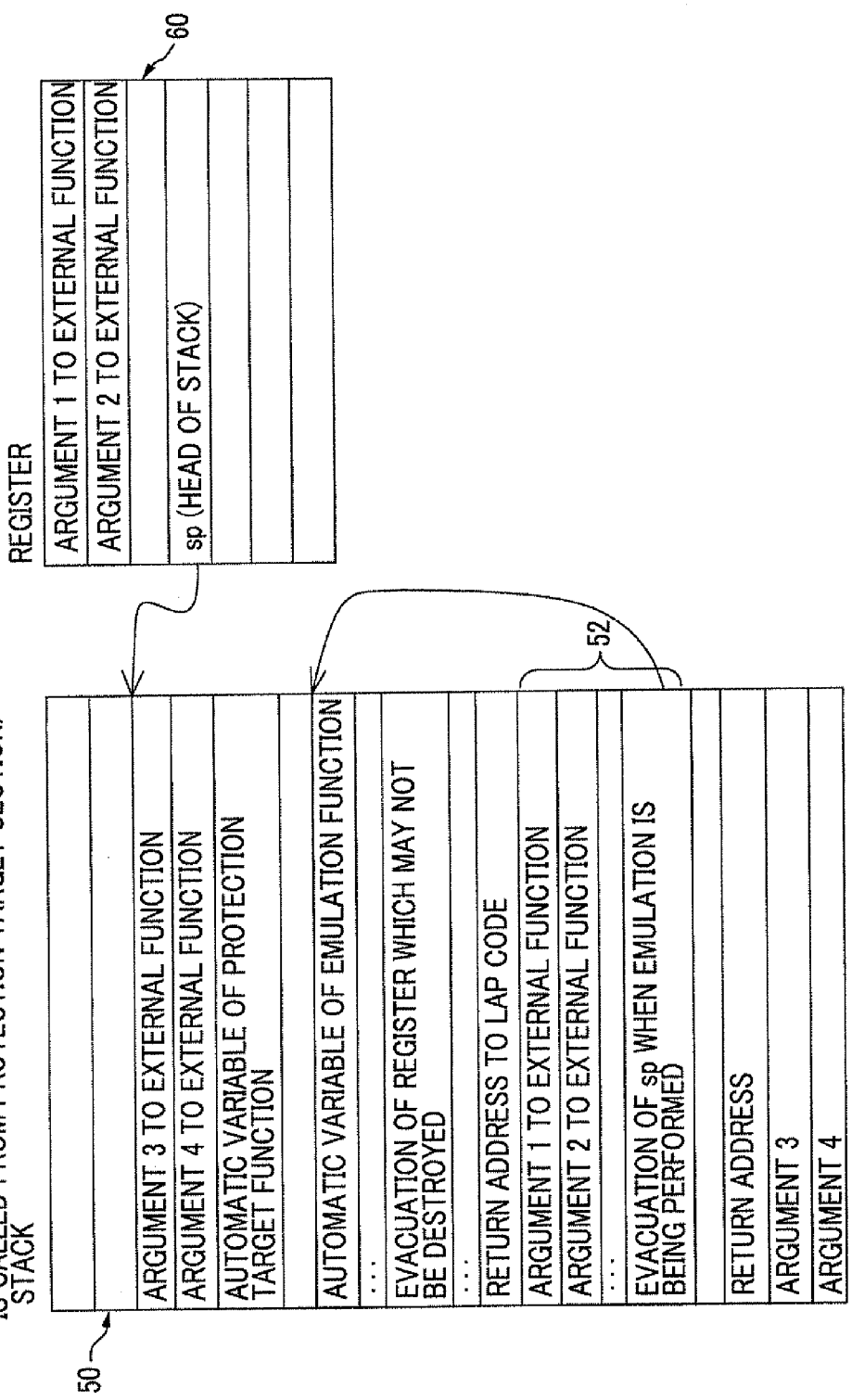
FIG. 12 is a view illustrating the states of the actual stack and the actual register group of the native environment when the program which is protected using the apparatus according to the exemplary embodiment is run, and, in particular, illustrating states at a time point in which the context maintenance code is executed before the external function is called.

When the emulator (that is, the virtual machine=the emulation function which is being executed) receives the command that the external function is called, the context maintenance process (in step S14) is executed to proceed to the external function as shown in FIG. 3. With the context maintenance process, the argument 1 and the argument 2 in the virtual register region 52 are written into the register 0 and the register 1 of the actual register group 60, as shown in FIG. 12. Therefore, the argument 1 and the argument 2 which are the parts of the context of the virtual machine environment are taken over to the native environment. In addition, with this context maintenance process, the stack pointer sp in the actual register group 60 and the value of the virtual stack pointer (virtual sp) in the virtual register region 52 are replaced. As the result of this replacement, the stack pointer sp in the actual register group 60 of the native environment indicates the head ("the argument 3 to the external function" is stored) of the virtual stack. Therefore, the called external function may correctly receive the argument 3 and the argument 4 in the virtual stack. Further, when the emulation restarts at the time of return from the external function thereafter, a value which is returned to the stack pointer in the actual register group 60 is evacuated on the virtual sp (virtual stack pointer) in the virtual register region 52. Meanwhile, it is not necessary that the evacuation of the stack pointer sp of the actual register group 60 is performed using the virtual sp. Alternatively, according to a rule of calling the function in the automatic variable region of the emulation function or the actual register group 60, the value may be evacuated to a register which is not destroyed.

Figure 13:
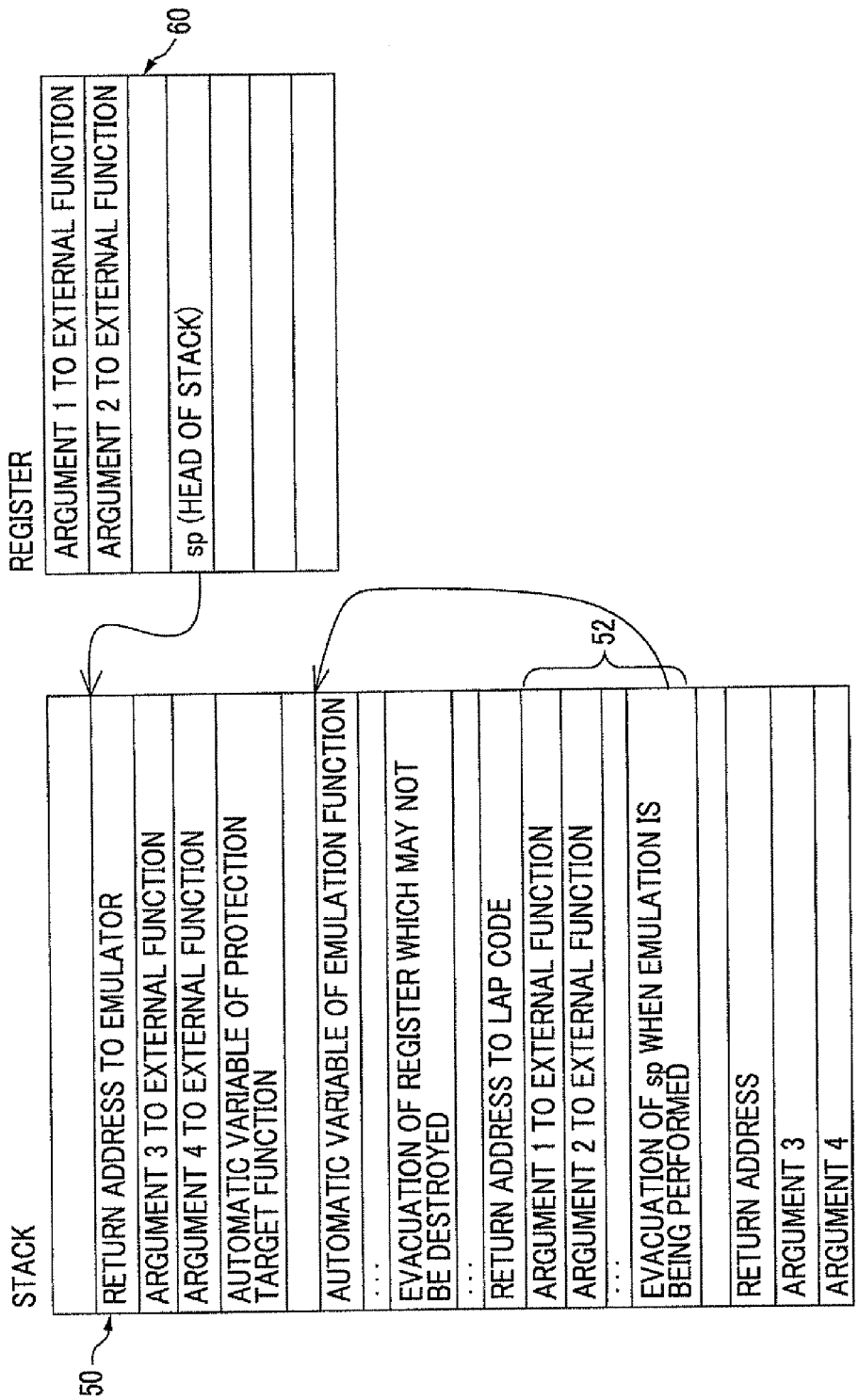
FIG. 13 is a view illustrating the states of the actual stack and the actual register group of the native environment when the program which is protected using the apparatus according to the exemplary embodiment is run, and, in particular, illustrating states at a time point immediately after the external function is called.

Thereafter, the command of the external function is executed in the native environment, the return address to the emulation function (virtual machine) is placed in the head of the actual stack 50, and the stack pointer sp is decremented by one, thus the process proceeds to the external function (FIG. 13). In addition, in the preprocessing of the external function, the value of the register of the actual register group 60, which is not destroyed according to the rule of calling a function, is evacuated.

Figure 14:
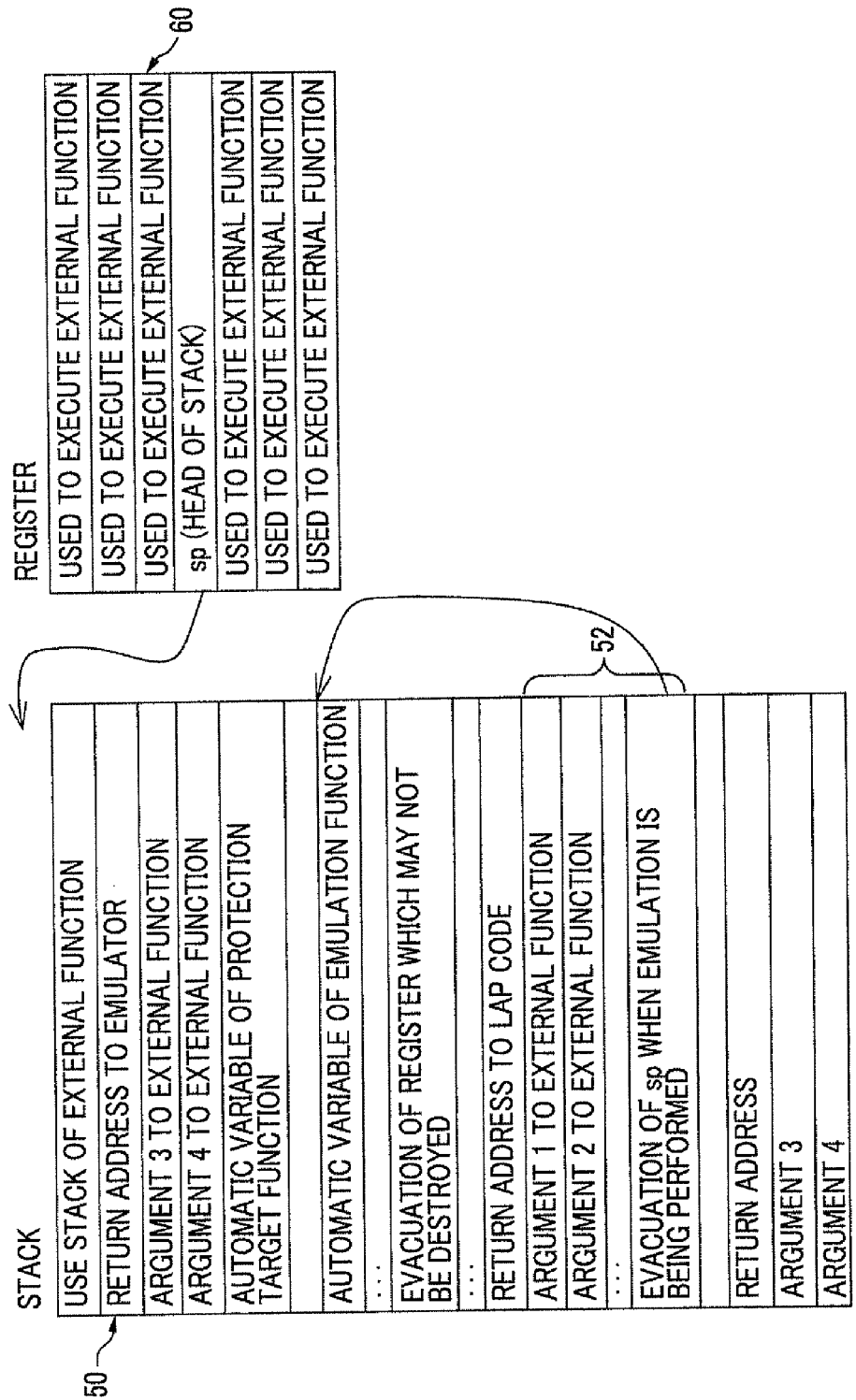
FIG. 14 is a view illustrating the states of the actual stack and the actual register group of the native environment when the program which is protected using the apparatus according to the exemplary embodiment is run, and, in particular, illustrating states when the called external function is being executed.

Thereafter, the executed external function receives the states of the actual stack 50 and the actual register group 60, and executes a normal process (the external function is directly executed in the native environment, refer to FIG. 14). At this time, a stack region used by the external function is piled up on the head of the actual stack 50.

Figure 15:
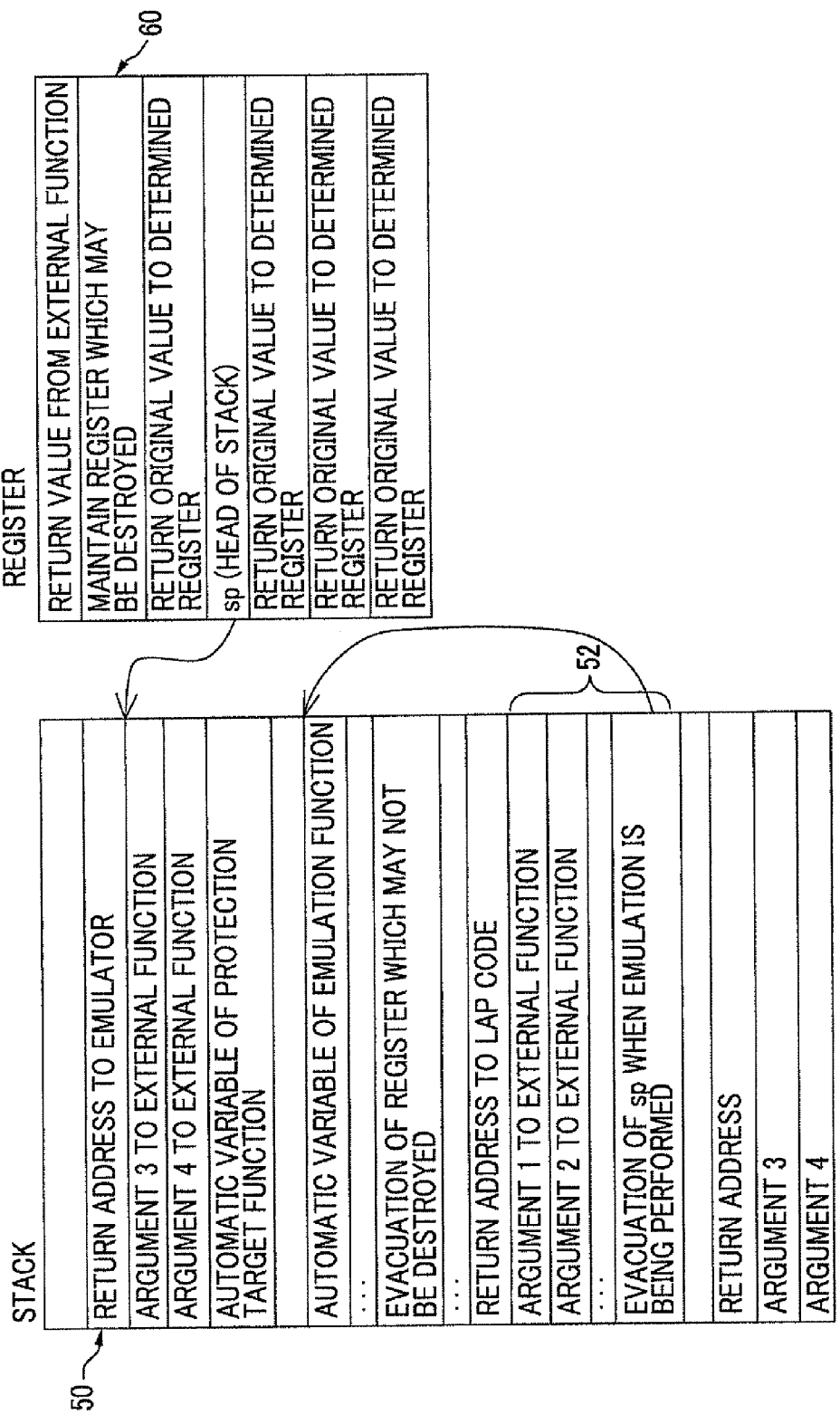
FIG. 15 is a view illustrating the states of the actual stack and the actual register group of the native environment when the program which is protected using the apparatus according to the exemplary embodiment is run, and, in particular, illustrating states at a time point in which the process is returned from the called external function to the protection target section.

In addition, as shown in FIG. 15, when the process of the native environment returns from the external function to the virtual machine (emulation function), the evacuated value is rewritten in the register, on which register evacuation is performed at the preprocessing section of the external function of the actual register group 60. In addition, the return value from the external function is input to the register (the register 0 in FIG. 15) to which the return value of the function of the actual register group 60 is input. In this state, the process returns to the virtual machine.

Figure 16:
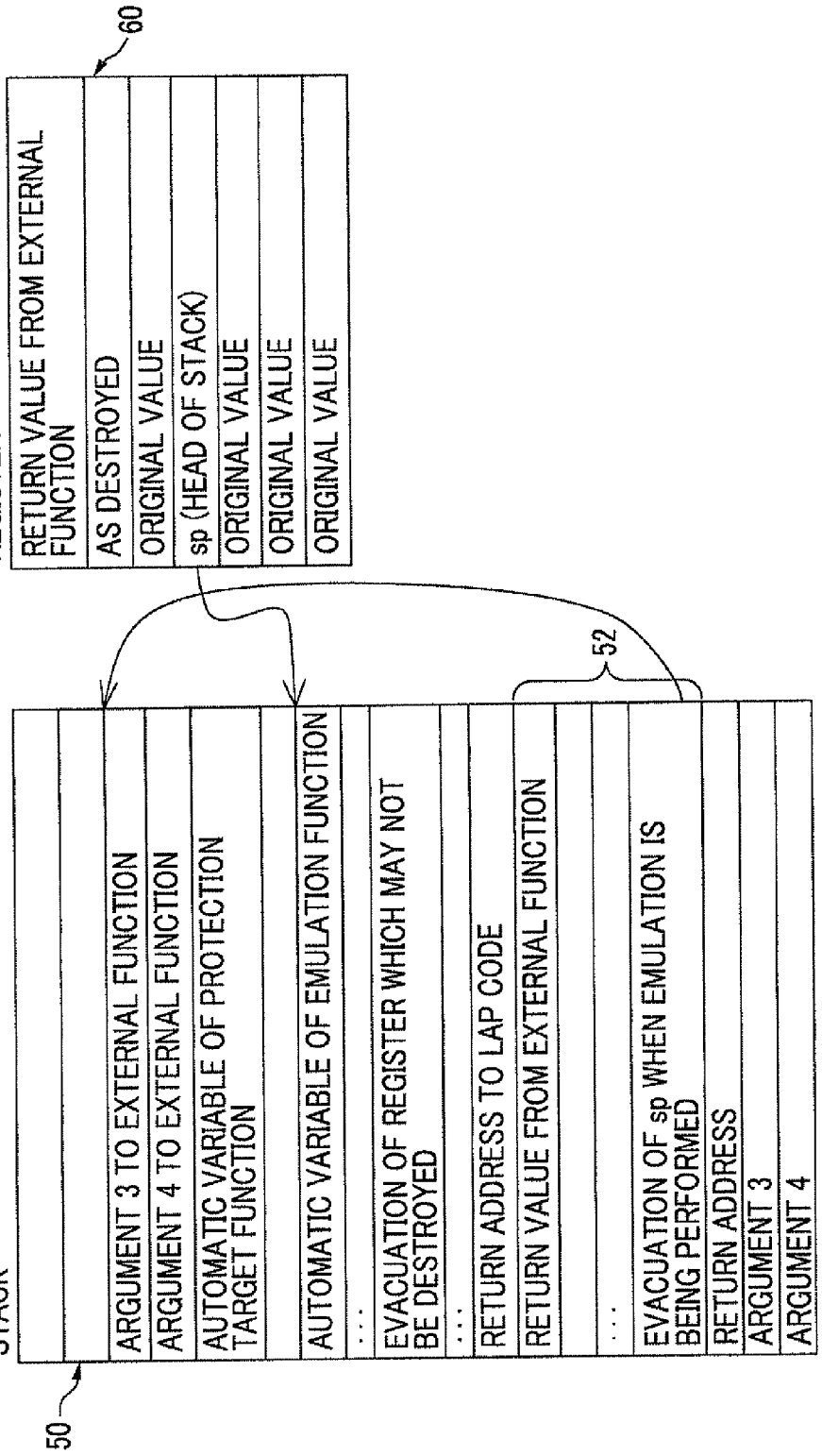
FIG. 16 is a view illustrating the states of the actual stack and the actual register group of the native environment when the program which is protected using the apparatus according to the exemplary embodiment is run, and, in particular, illustrating states at a time point in which the context maintenance code is executed when the process is returned from the called external function to the protection target section.

If the process is returned from the external function (Yes as the determination result of step S18 in FIG. 3), the virtual machine executes the context maintenance process when the process is returned from the external function (step S20 in FIG. 3). In this process, the value in the register, to which the return value of the function in the actual register group 60 is input, is written in the corresponding region of the virtual register region 52, and the value of the actual stack pointer sp in the actual register group 60 is replaced with the value of the virtual stack pointer in the virtual register region 52 (refer to FIG. 16). Meanwhile, when the stack pointer is evacuated in the register which is not destroyed according to the rule of calling a function in the automatic variable region or the actual register group 60, the value is returned from the evacuated section to the actual stack pointer. Therefore, the virtual machine receives the result of the external function and continues the emulation.

Figure 17:
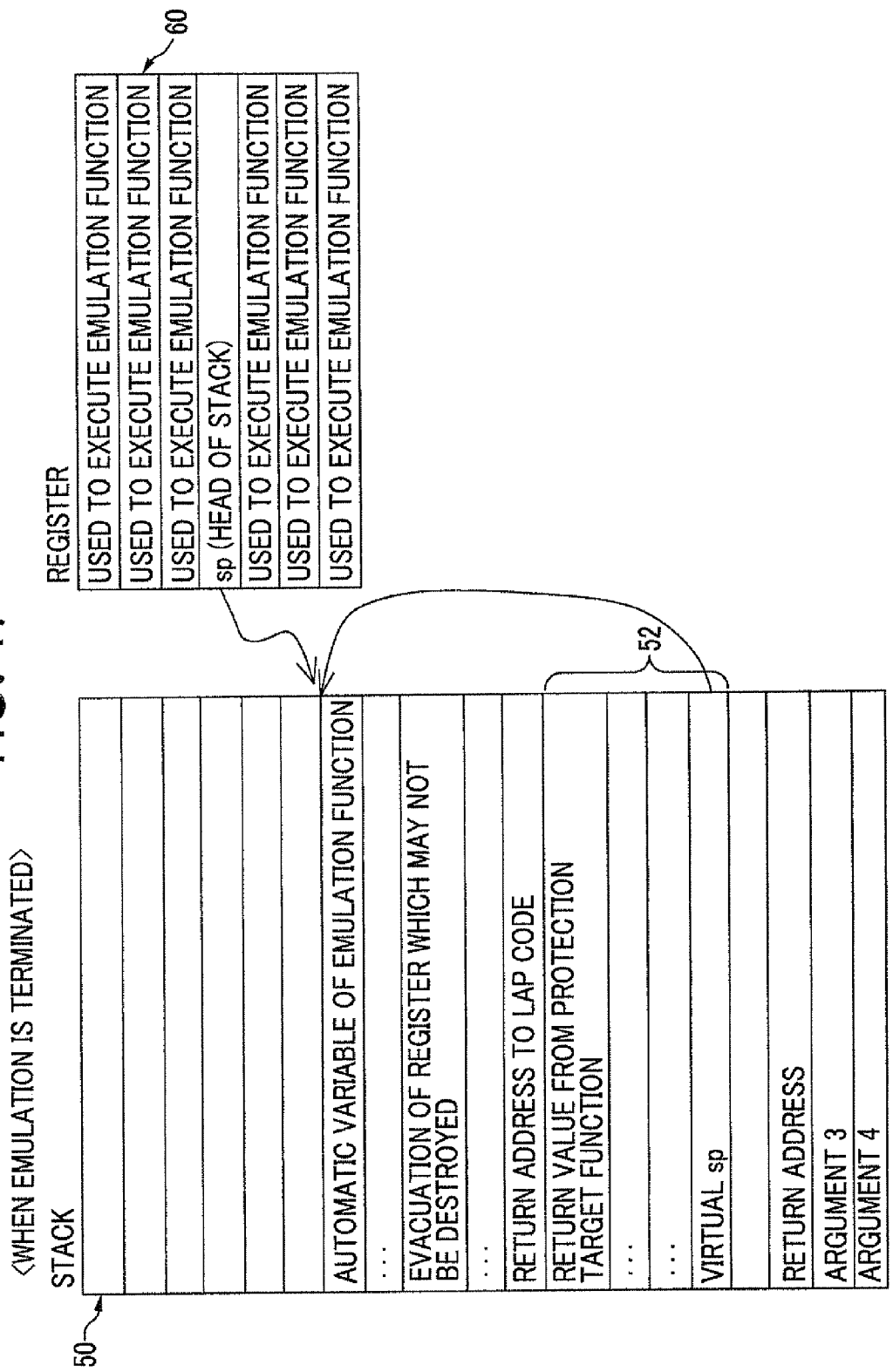
FIG. 17 is a view illustrating the states of the actual stack and the actual register group of the native environment when the program which is protected using the apparatus according to the exemplary embodiment is run, and, in particular, illustrating states at a time point in which the execution of the protection target section performed using the virtual machine is completed.

FIG. 17 illustrates the states of the actual stack 50 and the actual register group 60 at a time point in which the execution of the protection target function which has been described until now is terminated and the process of the virtual machine reaches the command that the process returns from the protection target function. At this time point, the stack used for the protection target function disappeared, and the stack pointer sp in the actual register group 60 indicates the same address as at the emulation start time point shown in FIG. 8. In addition, the virtual stack pointer in the virtual register region 52 indicates the same address.

Figure 18:
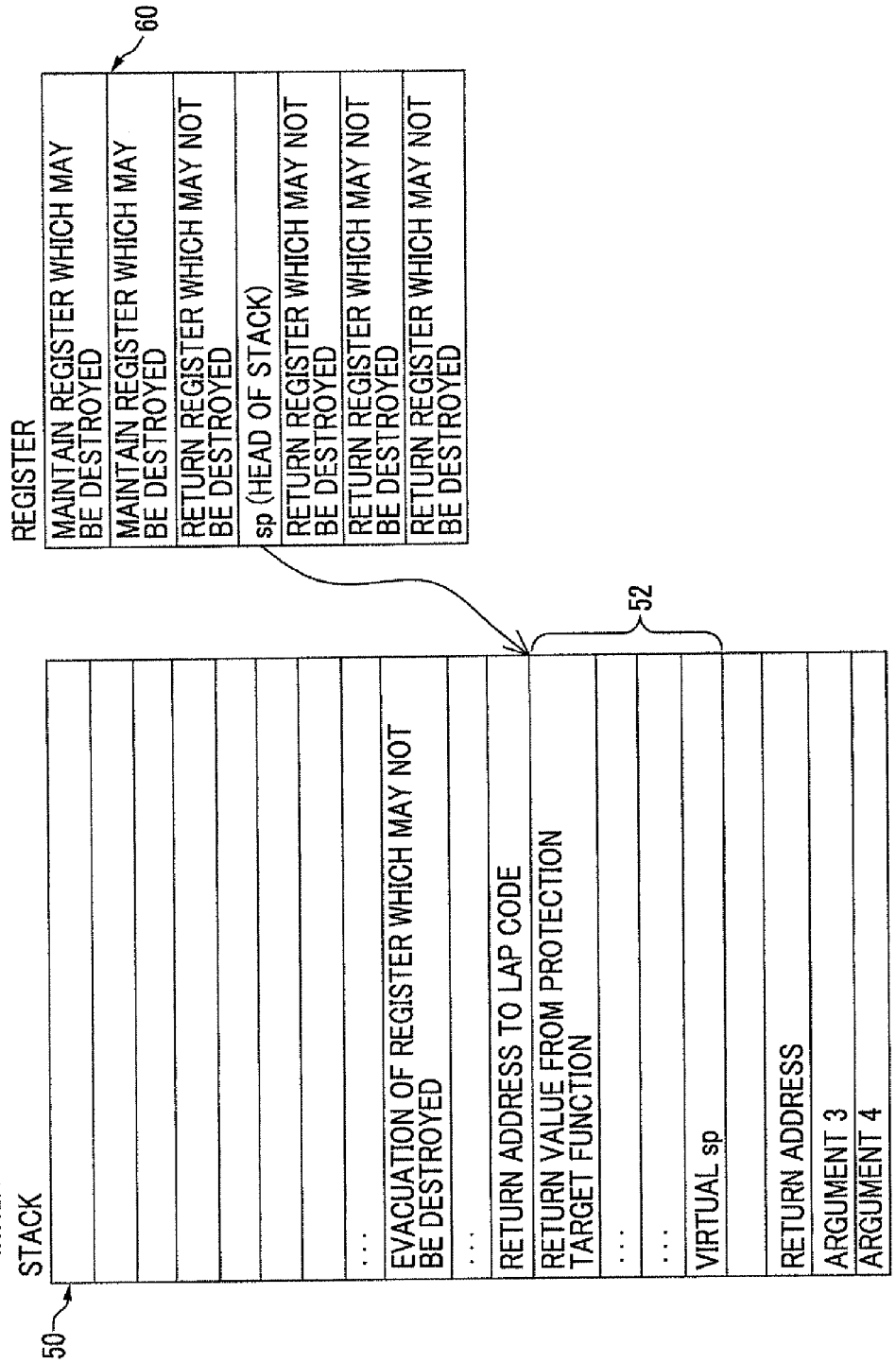
FIG. 18 is a view illustrating the states of the actual stack and the actual register group of the native environment when the program which is protected using the apparatus according to the exemplary embodiment is run, and, in particular, illustrating states at a time point in which the process is returned from the execution of the protection target section to the execution of the lap code.

Thereafter, in order to open the region of the automatic value used for the execution of the emulation function (virtual machine), the value of the actual stack pointer sp in the actual register group 60 is increased by as many as the size of the automatic variable region, and the value of the register which is evacuated to the stack and is not destroyed is returned to the actual register group 60, so that the region of the evacuated value in the actual stack 50 is open (refer to FIG. 18). At this state, since the stack pointer sp in the actual register group 60 indicates the location of the stack to which the return address to the lap code in the actual stack 50 is input, the native environment executes the return command from the emulation function, and the process is returned to the lap code 214.

Figure 19:
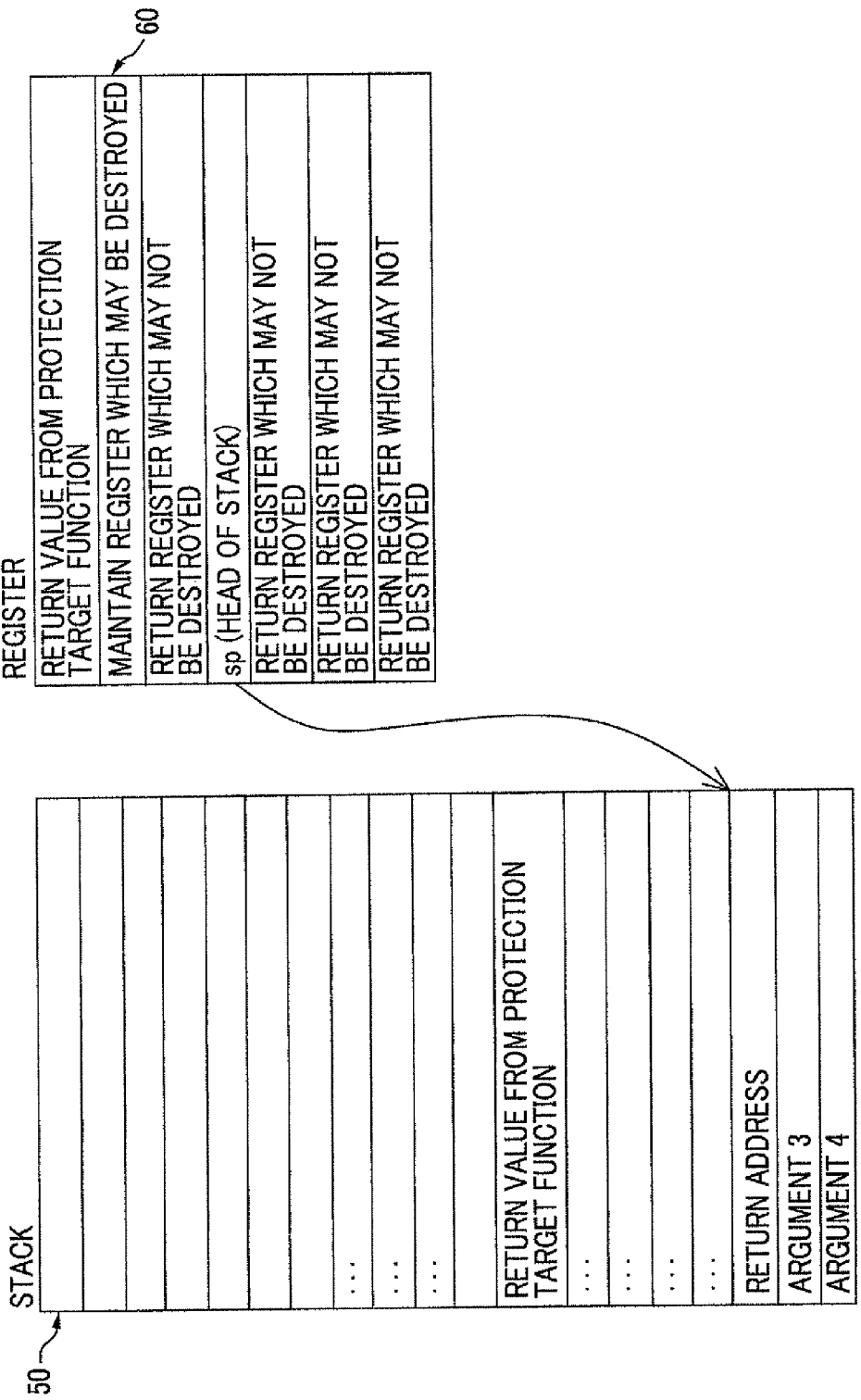
FIG. 19 is a view illustrating the states of the actual stack and the actual register group of the native environment when the program which is protected using the apparatus according to the exemplary embodiment is run, and, in particular, illustrating states after the context maintenance code C is executed after the process is returned from the virtual machine to the native environment.

If the process is returned to the lap code 214, the context maintenance code C (refer to FIG. 2), which describes the context maintenance process when the process returns from the virtual machine environment to the native environment, is executed using the native environment. With this execution, as shown in FIG. 19, the value of the register, to which the return value from the protection target function is input, in the virtual register region 52 is written in the actual register group 60. In the end, since the virtual register region 52 is open, the context maintenance code C causes the size of the virtual register region 52 to be added to the value of the stack pointer sp in the actual register group 60. Meanwhile, the return value from the protection target function may be written in the actual register group 60 at a time point in which the stack pointer sp is added.

Figure 20:
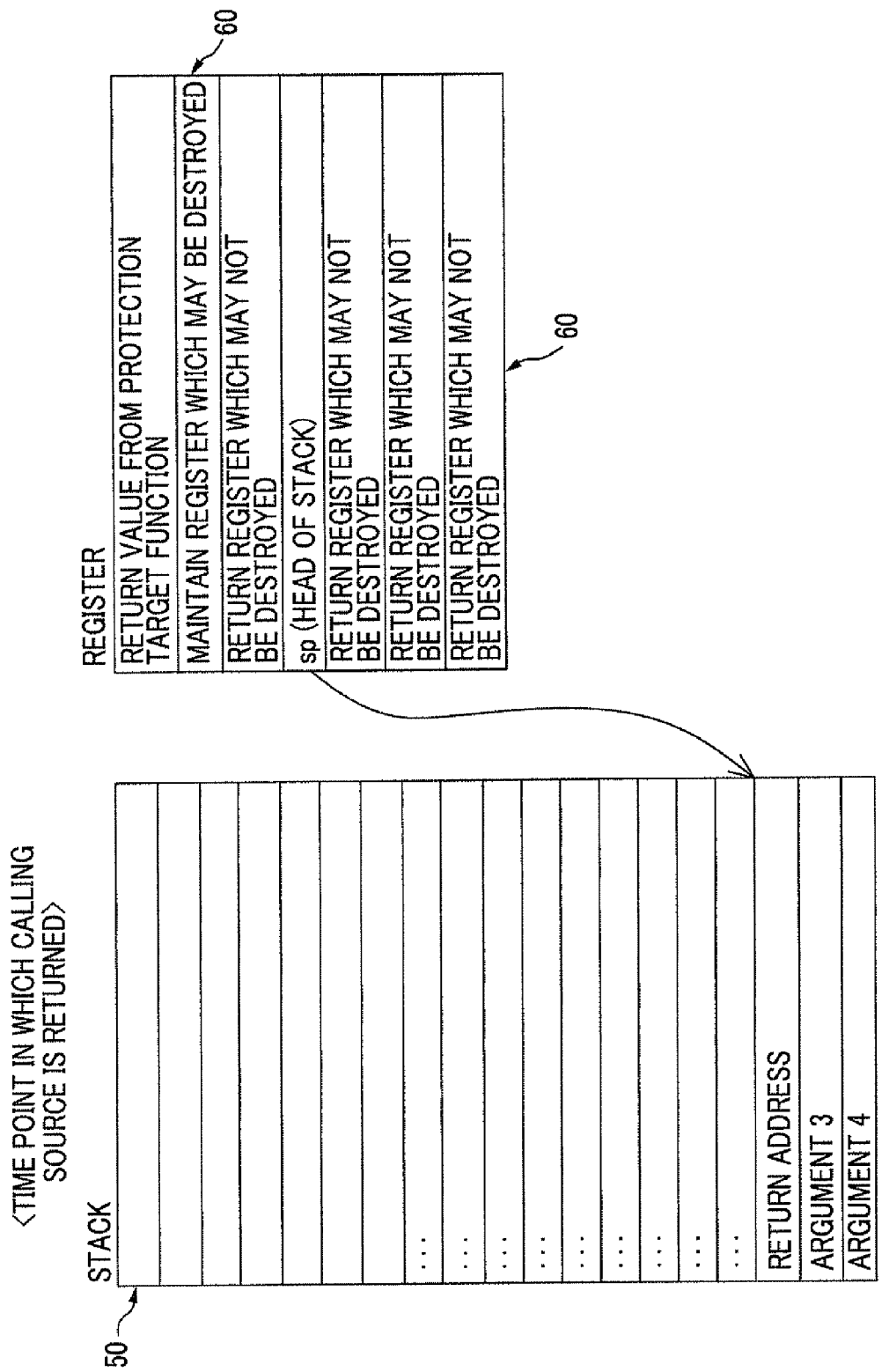
FIG. 20 is a view illustrating the states of the actual stack and the actual register group of the native environment when the program which is protected using the apparatus according to the exemplary embodiment is run, and, in particular, illustrating states at a time point in which the process is returned to the execution of a non-protection target section after the context maintenance code C is executed.

At this time point, as shown in FIG. 20, the stack pointer sp in the actual register group 60 indicates the return address to the calling source (the non-protection target section of the native code 212) of the protection target function (more exactly, the lap code 214). Therefore, the native environment executes the return command from the function, thereby receiving the return value from the protection target function and continuing the execution of the native code 212 of the calling source.

When the context maintenance is attempted using the above-described flow, the process may proceed from the non-protection target section of the native code 212 to the emulation execution of the protection target section and the from the protection target section which is emulated to the native execution of the external function.

Figure 21:
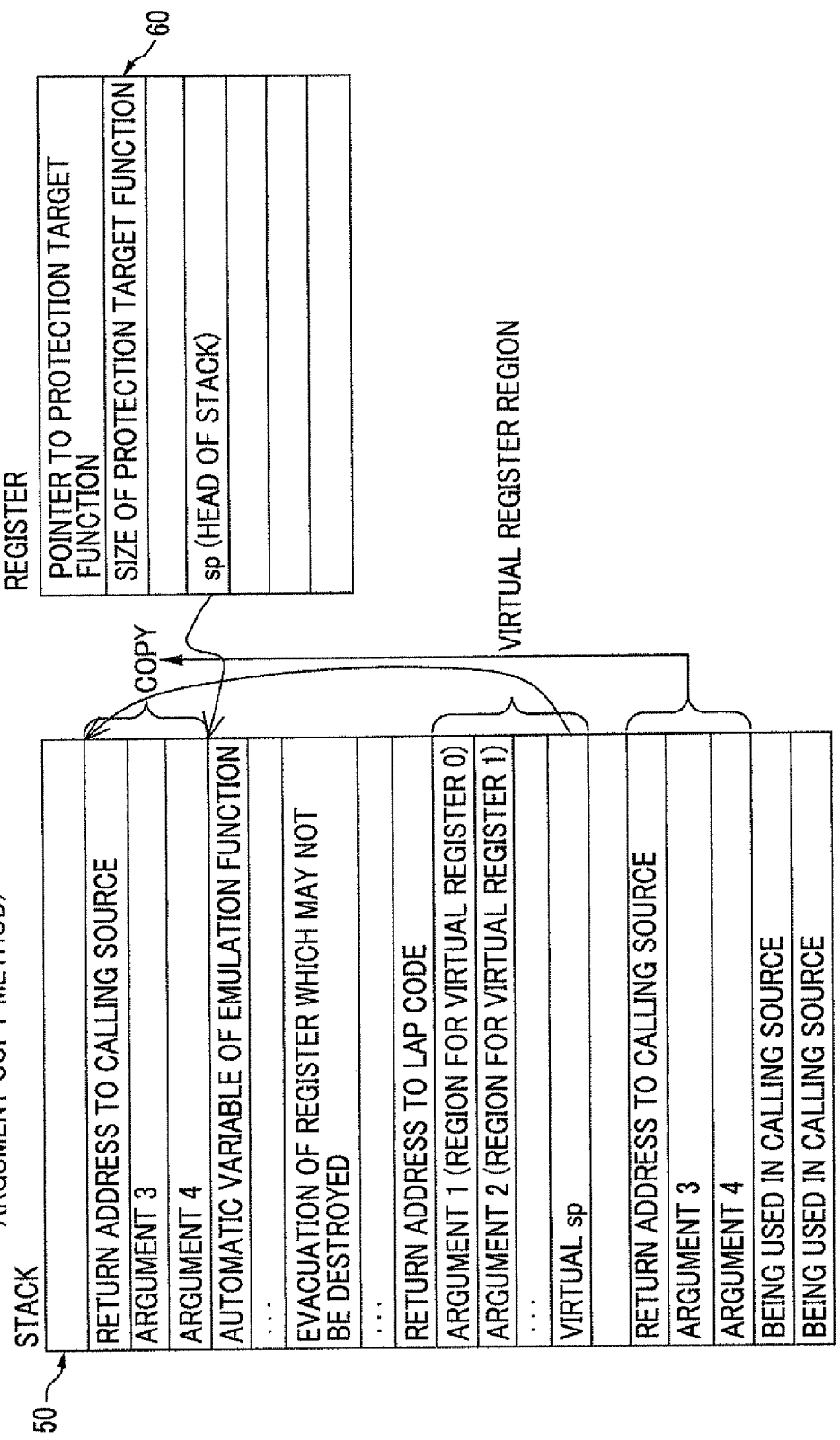
FIG. 21 is a view illustrating the states of the actual stack and the actual register group of the native environment when the program which is protected using the apparatus according to the exemplary embodiment is run, and, in particular, illustrating states at a time point in which the execution of the protection target section starts using the virtual machine when an argument copy manner is used in order to deliver an accurate argument to the virtual machine.
Figure 22:
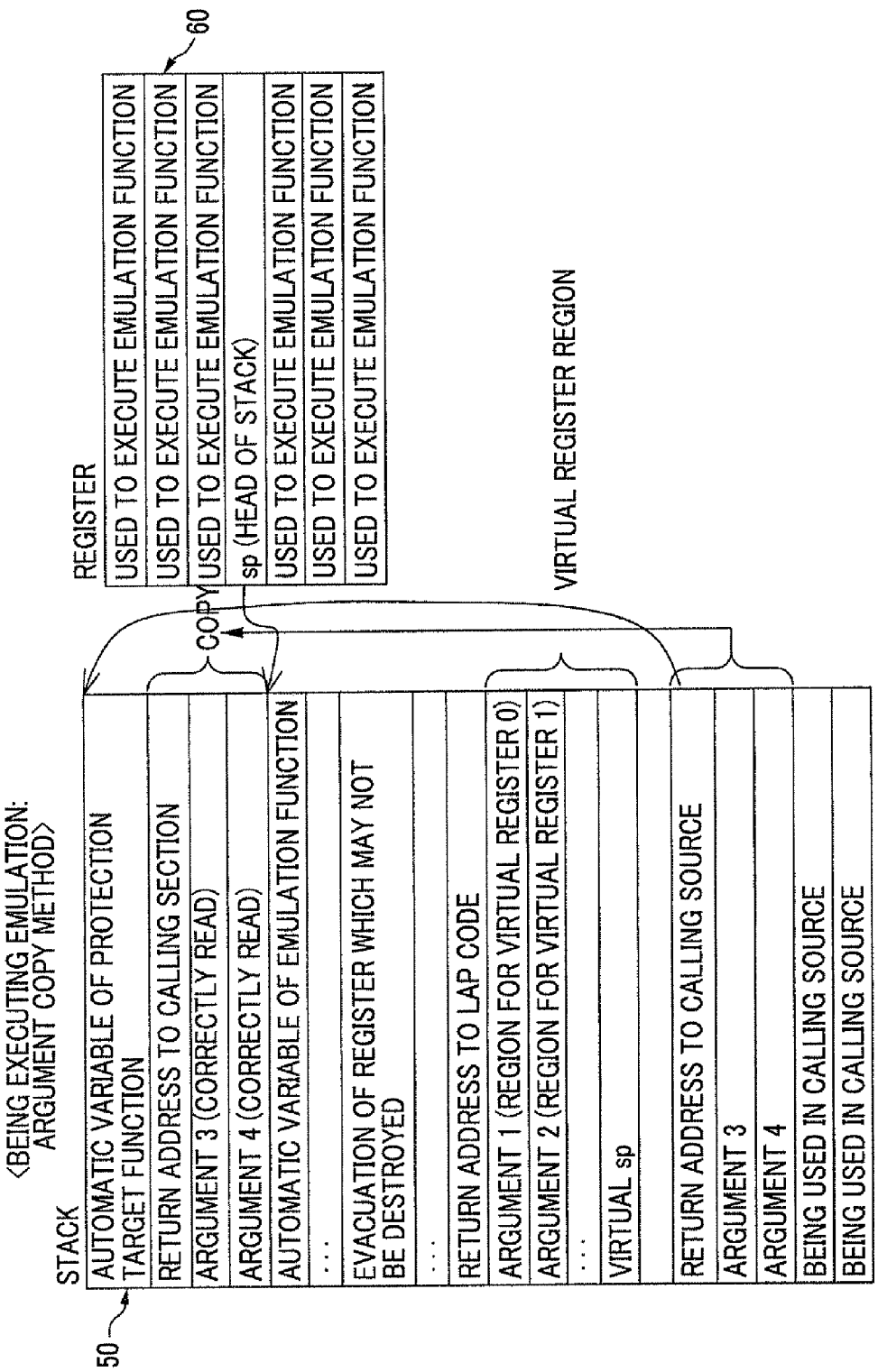
FIG. 22 is a view illustrating the states of the actual stack and the actual register group of the native environment when the program which is protected using the apparatus according to the exemplary embodiment is run, and, in particular, illustrating states in which the protection target section is being executed using the virtual machine when the argument copy manner is used in order to deliver the accurate argument to the virtual machine.

Therefore, as described with reference to FIG. 10 in the above-described methods, when the protection target function is executed, the virtual machine reads the argument 3 and the argument 4 which are piled on the inner side of the address a by replacing the addresses thereof. However, this is only an example. As another method, when the execution of the preprocessing section (prolog) of the emulation function is finished, the argument 3 and the argument 4 piled on the actual stack 50 may be copied onto the bottom section of the virtual stack before the protection target function is called, as shown in FIG. 21. In this case, the return address to the calling source may be further copied. For this purpose, a method of determining the restriction of the program by delivering the number of arguments (size) which are copied to the emulation function as arguments, or automatically copying a determined size may be considered such that an argument, the size of which is equal to or larger than the above, is not delivered. In this method, the virtual machine which executes the protection target function may perform a normal operation by executing a process of reading the argument 3 and the argument 4 from the head of the virtual stack, as shown in FIG. 22.

Hereinbefore, the structure of the partial protection of a program in the exemplary embodiment and a method in which the partially protected program is executed in the native environment (and the virtual machine executed on the native environment) are described.

In order to implement the above structure, it is necessary that context may be converted between the virtual machine and the native environment with each other. As an example, the architecture which is the same as the native environment (for example, the configuration of a register or a stack to be used) may be used as the virtual machine. Here, the virtual machine uses an individual command code relationship which has the same architecture as that of the native environment, and has different binary encodes of the command.

When the virtual machine using the individual command code relationship (which is different from the command code relationship of the native environment) is used as described above, the protection target section extracting unit 16 converts the code (which is described as a code for the native environment) of the protection target section 114 extracted from the object code 100 into the individual code relationship for the virtual machine, and writes the protection target section 222 obtained through the conversion into the data region 220 of the object code 200 using the protection target section movement unit 18. In this method, even when an attacker notices the code of the protection target section 222 which temporarily exists in the data region of the memory, it takes more time and work for the attacker to analyze the content of the protection target section 222 (than a case where the protection target section 222 is described using a native environment coding system).

In addition, as a modification, the protection target section 222 which is placed in the object code 200 may be encrypted. In this case, in an example, the protection target section 222*a* which is placed in the data region 220 of the protected object code 200 includes the result of the encryption of the protection target section 114 (or a section which converts the protection target section into an individual coding system for the virtual machine) and a decryption code used to decrypt the result of the encryption. In this example, if the virtual machine call code B is executed in the native environment, the protection target section 222*a* is configured such that the decryption code is first executed, the result of the encryption of the protection target section is decrypted using the decryption code, and the decrypted protection target section is executed using the virtual machine. Meanwhile, the decryption code may be located in the lap code 214 (for example, a location called after the context maintenance code A, that is, before the virtual machine call code B) instead of the protection target section 222*a*.

Since the protection target section 222*a* is placed at the data region (writable region) on the memory, the result of the encryption of the protection target section may be decrypted using the decryption code, and the result obtained through the decryption may be written into the data region and then executed.

In addition, when the process returns from the execution of the decrypted protection target section to the execution of the non-protection target section in the native code 212, the code of the decrypted protection target section spread in the data region may be encrypted again (encryption which may be decrypted using the decryption code). For this purpose, for example, a code in which a re-encryption process is described may be included in the protection target section 222*a* or in the lap code 214.

In addition, a strong protection may be attempted by encrypting the code of the protection target section in multiplex manner.

In addition, a code for a debugger analysis measure may be included in the lap code 214 as another modification. For example, when the fact that analysis is performed using a debugger tool is detected, the process of stopping the execution of the native code 212 immediately or after an error alarm display is performed using the code for the debugger analysis measure is described. The code for the debugger analysis measure may be included in the lap code 214 in the form in which the code for the debugger analysis measure is executed before the virtual machine call code B is executed. The protection target section 222 is protected from being analyzed by a debugger in such a way as to execute the code for the debugger analysis measure.

Figure 23:
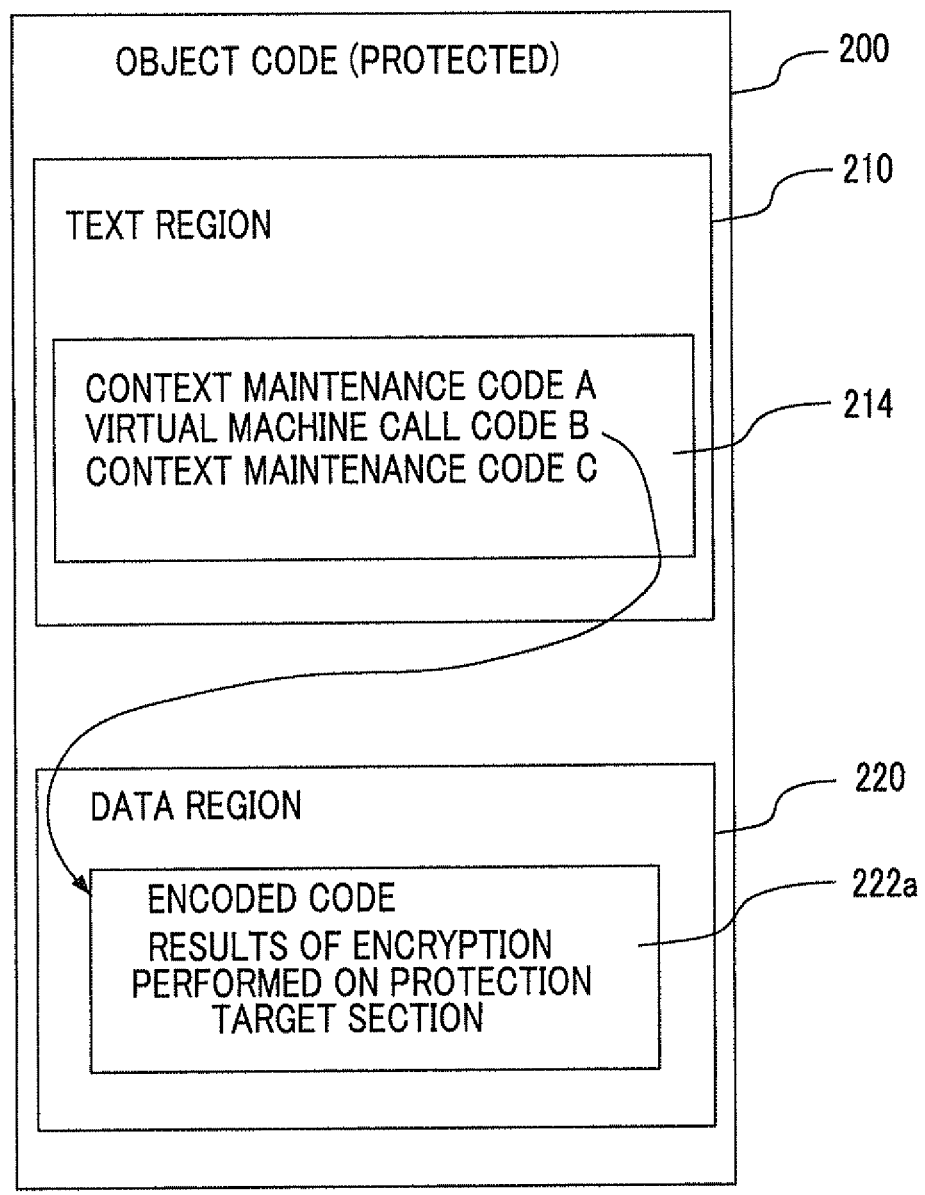
FIG. 23 is a view illustrating an example of the data structure of an object code when a protection target function is encoded.

In addition, as another example of the debugger analysis measure, there is a method of preventing the result of the encryption of the protection target section in the data region from being correctly decrypted when the fact that the native code 212 is analyzed using the debugger tool is known. For example, a decryption key used for the decryption code (refer to FIG. 23) is caused to be generated based on the result of detection of a debugger. When a debugger is not detected, an accurate decryption key may be caused to be obtained, and, when a debugger is detected, a wrong decryption key may be caused to be obtained. Such a code used to detect a debugger and to generate a decryption key may be written into the lap code 214 in the form in which the code is executed before the virtual machine call code B is executed. In this example, if the native code 212 is analyzed using the debugger tool, a wrong decryption key is generated when the protection target section is called. Therefore, the result of the decryption of the protection target section using the decryption key is wrong. If the process is continued after the analysis performed by the debugger is detected, the result of the wrong decryption is executed. Therefore, the virtual machine (and the native environment which executes the virtual machine) goes out of control.

Figure 4:
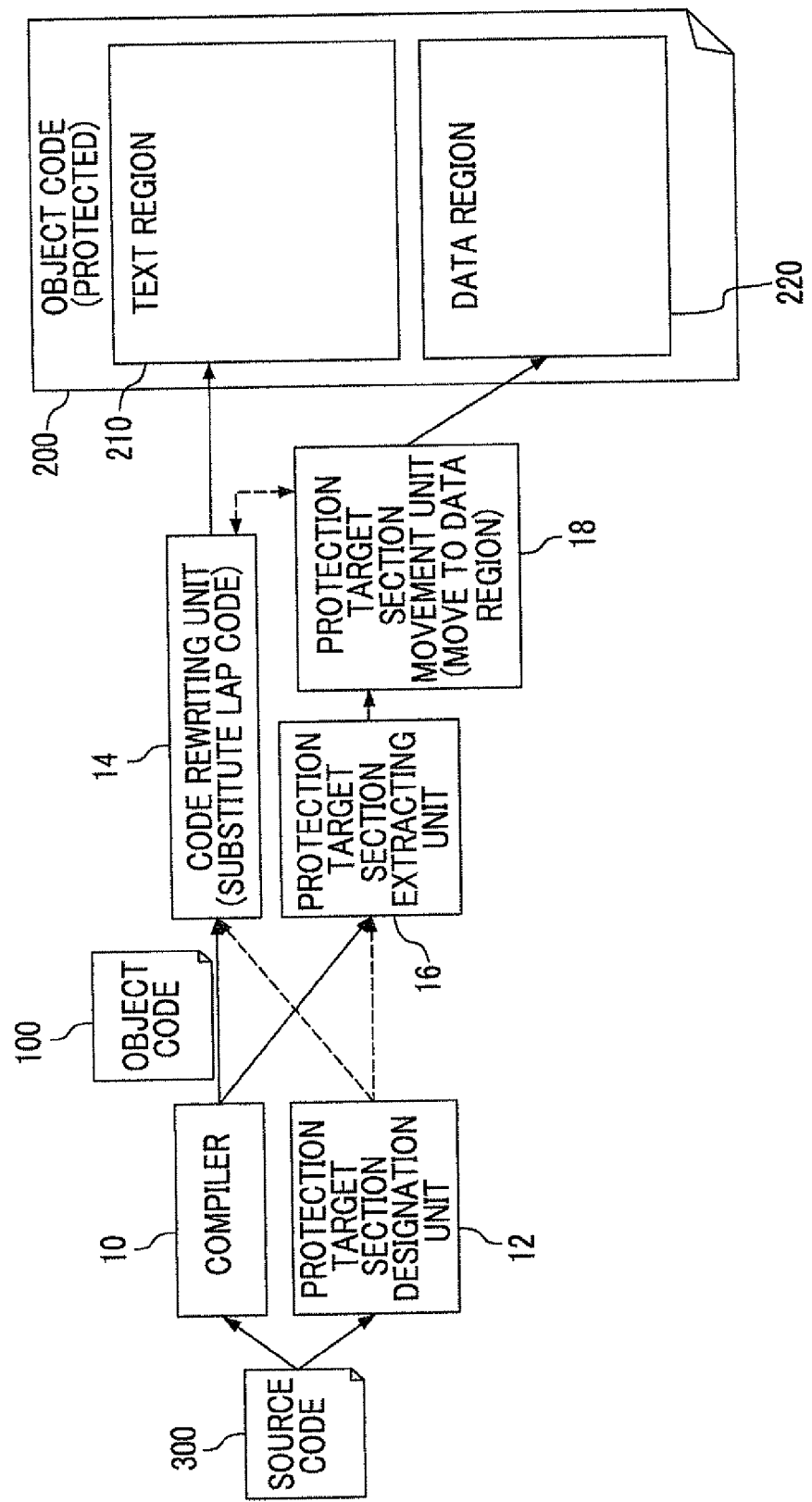
FIG. 4 is a block diagram illustrating an example of a program protection apparatus according to the exemplary embodiment.

The apparatus, shown in FIG. 4 and used to protect a part of the program, is implemented in such a way as to run a program which shows the process of each of the above-described functional modules, for example, on a general purpose computer. Here, the computer has a circuit configuration as a hardware, in which, for example, a microprocessor such as a CPU, a memory (primary memory) such as a Random Access Memory (RAM) or a Read-Only Memory (ROM), a Hard Disk Drive (HDD) controller, which controls an HDD, various types of Input/Output (I/O) interfaces, and a network interface which performs control in order to be connected to a network such as a local area network are connected via, for example, a bus. In addition, for example, a disk drive used to perform reading and/or writing on a portable disk recording medium, such as a Compact Disk (CD) or Digital Video Disk (DVD), or a memory reader writer used to perform reading and/or writing on a portable non-volatile recording medium, such as a flash memory, which has various types of standards, may be connected to the bus via, for example, the I/O interfaces. The program, in which the processed content of each of the above-illustrated functional modules is described, is preserved in a fixed memory apparatus, such as a hard disk drive, via a recording medium, such as a CD or a DVD, or a communication unit, such as a network, and installed in the computer. The above-illustrated functional module group is implemented in such a way that the program memorized in the fixed memory apparatus is read into the RAM and executed using a microprocessor, such as a CPU.

Meanwhile, the apparatus which is illustrated in FIG. 4 and the native environment which executes the protected program (object code 200) run using the apparatus may be physically the same computer and may be other computers.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling those skilled in the art to understand the invention for various embodiments and with the various modifications as are suited to the particular use contemplated. It is intended that the scope of the invention be defined by the following claims and their equivalents.

What is claimed is:

1. A non-transitory computer readable medium storing a program executed by a computer, the program comprising:
    a designation receiving unit that receives a designation of a protection target section which is a protection target for the program;
    a movement arranging unit that moves and arranges the protection target section of the program to a second arrangement location which is different from a first arrangement location which corresponds to an arrangement location of the protection target section of the program; and
    a changing unit that changes the protection target section of the program to a substitution code, the substitution code including the protection target section in the second arrangement location, the changing unit converting code of the protection target section into an individual code relationship for a virtual machine,
    wherein the substitution code causes a native environment to execute:
        a reconstruction unit that reconstructs context of the native environment at a time point in which the program is executed until immediately before the program proceeds to the protection target section as virtual context for the virtual machine in a memory of the native environment, and
        a virtual machine execution unit that executes the virtual machine, and delivers information indicative of an address in the memory of the reconstructed virtual context using the reconstruction unit to the virtual machine, so that the virtual machine executes the protection target section using the virtual context.

2. The non-transitory computer readable medium storing the program according to claim 1, wherein the substitution code causes the native environment to further function as a rewriting unit that, at a time point in which a process returns from execution of the protection target section on the virtual machine to execution of the program of the native environment, rewrites at least a part of the virtual context at the time point as the context of the native environment.

3. The non-transitory computer readable medium storing the program according to claim 2, wherein, when a call command, of the protection target section, that calls a native execution code which is executed on the native environment is executed, the virtual machine executes a process of rewriting the virtual context of the virtual machine at a time point immediately before the corresponding call command is executed into the context of the native environment, and executes the call command after the rewriting process is executed.

4. The non-transitory computer readable medium storing the program according to claim 3, wherein, when a return command that instructs to return to the protection target section from the native execution code is received, the virtual machine executes the process of rewriting the context of the native environment at the time point immediately before the return command is executed into the virtual context of the virtual machine, and executes the return command after the rewriting process is performed.

5. The non-transitory computer readable medium storing the program according to claim 4,
    wherein the virtual machine uses a second command coding system which is different from a first command coding system which is a command coding system of the native environment,
    wherein the program is described using the first command coding system, and
    wherein the movement arranging unit converts description in the first command coding system of the protection target section of the program into description in the second command coding system, and moves to arrange the protection target section, obtained after the conversion is performed, to the second arrangement location.

6. The non-transitory computer readable medium storing the program according to claim 3,
    wherein the virtual machine uses a second command coding system which is different from a first command coding system which is a command coding system of the native environment,
    wherein the program is described using the first command coding system, and
    wherein the movement arranging unit converts description in the first command coding system of the protection target section of the program into description in the second command coding system, and moves to arrange the protection target section, obtained after the conversion is performed, to the second arrangement location.

7. The non-transitory computer readable medium storing the program according to claim 2,
    wherein the virtual machine uses a second command coding system which is different from a first command coding system which is a command coding system of the native environment,
    wherein the program is described using the first command coding system, and
    wherein the movement arranging unit converts description in the first command coding system of the protection target section of the program into description in the second command coding system, and moves to arrange the protection target section, obtained after the conversion is performed, to the second arrangement location.

8. The non-transitory computer readable medium storing the program according to claim 7, wherein the movement arranging unit encrypts the protection target section obtained after the conversion to the second command coding system is performed, and arranges the encrypted protection target section at the second arrangement location, together with a decryption code to decrypt the encrypted protection target section in the native environment.

9. The non-transitory computer readable medium storing the program according to claim 1, wherein, when a call command, of the protection target section, that calls a native execution code which is executed on the native environment is executed, the virtual machine executes a process of rewriting the virtual context of the virtual machine at a time point immediately before the corresponding call command is executed into the context of the native environment, and executes the call command after the rewriting process is executed.

10. The non-transitory computer readable medium storing the program according to claim 9, wherein, when a return command that instructs to return to the protection target section from the native execution code is received, the virtual machine executes the process of rewriting the context of the native environment at the time point immediately before the return command is executed into the virtual context of the virtual machine, and executes the return command after the rewriting process is performed.

11. The non-transitory computer readable medium storing the program according to claim 10,
   wherein the virtual machine uses a second command coding system which is different from a first command coding system which is a command coding system of the native environment,
   wherein the program is described using the first command coding system, and
   wherein the movement arranging unit converts description in the first command coding system of the protection target section of the program into description in the second command coding system, and moves to arrange the protection target section, obtained after the conversion is performed, to the second arrangement location.

12. The non-transitory computer readable medium storing the program according to claim 9,
   wherein the virtual machine uses a second command coding system which is different from a first command coding system which is a command coding system of the native environment,
   wherein the program is described using the first command coding system, and
   wherein the movement arranging unit converts description in the first command coding system of the protection target section of the program into description in the second command coding system, and moves to arrange the protection target section, obtained after the conversion is performed, to the second arrangement location.

13. The non-transitory computer readable medium storing the program according to claim 1,
   wherein the virtual machine uses a second command coding system which is different from a first command coding system which is a command coding system of the native environment,
   wherein the program is described using the first command coding system, and
   wherein the movement arranging unit converts description in the first command coding system of the protection target section of the program into description in the second command coding system, and moves to arrange the protection target section, obtained after the conversion is performed, to the second arrangement location.

14. The non-transitory computer readable medium storing the program according to claim 13, wherein the movement arranging unit encrypts the protection target section obtained after the conversion to the second command coding system is performed, and arranges the encrypted protection target section at the second arrangement location, together with a decryption code to decrypt the encrypted protection target section in the native environment.

15. The non-transitory computer readable medium storing the program according to claim 14,
   wherein the substitution code causes the native environment to function as:
      a unit that determines whether the program is analyzed using a debugger; and
      a key generation unit that generates a first decryption key which correctly decrypts the protection target section obtained after the encryption when it is determined that the program is not analyzed using the debugger, and that generates a second decryption key which does not correctly decrypt the protection target section obtained after the encryption when it is determined that the program is analyzed using the debugger, and
   wherein the decryption code decrypts the encrypted protection target section in the native environment using one of the first decryption key and the second decryption key which are generated by the key generation unit.

16. The non-transitory computer readable medium storing the program according to claim 13,
   wherein the movement arranging unit encrypts the protection target section obtained after the conversion to the second command coding system is performed, and arranges the encrypted protection target section at the second arrangement location, and
   wherein the substitution code includes a decryption code to decrypt the encrypted protection target section in the native environment.

17. The non-transitory computer readable medium storing the program according to claim 1, wherein the movement arranging unit encrypts the protection target section, and arranges the encrypted protection target section at the second arrangement location together with a decryption code to decrypt the encrypted protection target section in the native environment.

18. The non-transitory computer readable medium storing the program according to claim 1,
   wherein the movement arranging unit encrypts the protection target section, and arranges the encrypted protection target section at the second arrangement location, and
   wherein the substitution code includes a decryption code to decrypt the encrypted protection target section in the native environment.

19. A program protection apparatus comprising:
   a designation receiving unit that receives designation of a protection target section which is a protection target of a program;
   a movement arranging unit that moves and arranges the protection target section of the program to a second arrangement location which is different from a first arrangement location which corresponds to an arrangement location of the protection target section of the program; and
   a changing unit that changes the protection target section of the program to a substitution code, the substitution code including the protection target section in the second arrangement location, the changing unit converting code of the protection target section into an individual code relationship for a virtual machine,
   wherein the substitution code causes a native environment to execute:
      a reconstruction unit that reconstructs context of the native environment at a time point in which the program is executed until immediately before the program proceeds to the protection target section as virtual context for the virtual machine in a memory of the native environment, and a virtual machine execution unit that executes the virtual machine, and delivers information indicative of an address in the memory of the reconstructed virtual context using the reconstruction unit to the virtual machine, so that the virtual machine executes the protection target section using the virtual context.

20. A program protection method comprising:

receiving designation of a protection target section which is a protection target of a program;

moving to arrange the protection target section of the program to a second arrangement location which is different from a first arrangement location which corresponds to an arrangement location of the protection target section of the program; and changing the protection target section of the program to a substitution code, the substitution code including the protection target section in the second arrangement location, the code of the protection target section being converted into an individual code relationship for a virtual machine, wherein the substitution code causes a native environment to execute:

reconstructing context of the native environment at a time point in which the program is executed until immediately before the program proceeds to the protection target section as virtual context for the virtual machine in a memory of the native environment, and executing the virtual machine, and delivering information indicative of an address in the memory of the reconstructed virtual context using the reconstructing step to the virtual machine, so that the virtual machine executes the protection target section using the virtual context.

* * * * *